(12) United States Patent
Beck et al.

(10) Patent No.: US 12,249,323 B2
(45) Date of Patent: Mar. 11, 2025

(54) ELECTRONIC FAUCET WITH SMART FEATURES

(71) Applicant: ASSA ABLOY Americas Residential Inc., New Haven, CT (US)

(72) Inventors: Chasen Beck, Costa Mesa, CA (US); Evan Benstead, Los Angeles, CA (US); Stephen Blizzard, Mission Viejo, CA (US); Elena Gorkovenko, Mission Viejo, CA (US); Matthew Lovett, Lake Forest, CA (US); Adam Tracy, Irvine, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 42 days.

(21) Appl. No.: 17/171,419

(22) Filed: Feb. 9, 2021

(65) Prior Publication Data

US 2021/0343281 A1   Nov. 4, 2021

Related U.S. Application Data

(63) Continuation of application No. 16/007,846, filed on Jun. 13, 2018, now Pat. No. 10,937,421, which is a (Continued)

(51) Int. Cl.
*G10L 15/22* (2006.01)
*E03C 1/05* (2006.01)
(Continued)

(52) U.S. Cl.
CPC .............. *G10L 15/22* (2013.01); *E03C 1/057* (2013.01); *G06F 3/016* (2013.01); *G06F 3/017* (2013.01); *G06F 3/04812* (2013.01); *G06F 3/167* (2013.01)

(58) Field of Classification Search
CPC .................................. G10L 15/22; E03C 1/055
See application file for complete search history.

(56) References Cited

U.S. PATENT DOCUMENTS 8,162,236 B2   4/2012   Rodenbeck et al.
9,194,110 B2   11/2015   Frick et al.
(Continued)

FOREIGN PATENT DOCUMENTS

CN    104238735 A    12/2014
CN    105179780 A    12/2015
(Continued)

OTHER PUBLICATIONS

Invitation to Pay Additional Fees with Partial International Search for Application No. PCT/US2017/067896 mailed Mar. 27, 2018.
(Continued)

*Primary Examiner* — Douglas Godbold
(74) *Attorney, Agent, or Firm* — Merchant & Gould P.C.

(57) ABSTRACT

A faucet is provided that electronically controls the flow volume and temperature of water being dispensed. The faucet illustratively includes a faucet body and a faucet handle. In some embodiments, the faucet may include a faucet body and be voice controlled. The faucet illustratively includes an inertial motion unit sensor mounted in the faucet handle to sense spatial orientation of the faucet handle. The faucet illustratively includes an electronic flow control system to adjust flow volume and temperature of water being dispensed. The faucet illustratively includes a controller configured to receive signals from the inertial motion unit sensor and control the electronic flow control system to adjust flow volume and temperature of water being dispensed based upon the position of the faucet handle.

16 Claims, 23 Drawing Sheets

Related U.S. Application Data continuation-in-part of application No. 15/851,445, filed on Dec. 21, 2017, now Pat. No. 11,176,932.

(60) Provisional application No. 62/529,561, filed on Jul. 7, 2017, provisional application No. 62/518,652, filed on Jun. 13, 2017, provisional application No. 62/438,492, filed on Dec. 23, 2016.

(51) Int. Cl.
*G06F 3/01* (2006.01)
*G06F 3/04812* (2022.01)
*G06F 3/16* (2006.01)

(56) References Cited

U.S. PATENT DOCUMENTS

| | | | |
|---|---|---|---|
| 10,120,354 B1* | 11/2018 | Rolston | H04L 12/2816 |
| 10,937,421 B2* | 3/2021 | Beck | G06F 3/04812 |
| 11,176,932 B2* | 11/2021 | Beck | E03C 1/0412 |
| 2001/0047262 A1* | 11/2001 | Kurganov | G10L 15/26 |
| | | | 704/270.1 |
| 2004/0193326 A1* | 9/2004 | Phillips | F16K 31/042 |
| | | | 700/282 |
| 2006/0186215 A1* | 8/2006 | Logan | E03C 1/055 |
| | | | 236/12.2 |
| 2009/0006099 A1* | 1/2009 | Sharpe | G06F 3/167 |
| | | | 704/E15.001 |
| 2011/0031331 A1* | 2/2011 | Klicpera | G01F 15/0755 |
| | | | 239/71 |
| 2012/0017367 A1* | 1/2012 | Reeder | E03C 1/057 |
| | | | 4/597 |
| 2012/0254810 A1* | 10/2012 | Heck | G06F 3/0487 |
| | | | 715/863 |
| 2012/0266983 A1 | 10/2012 | Tsai et al. | |
| 2013/0325484 A1* | 12/2013 | Chakladar | G10L 15/26 |
| | | | 704/275 |
| 2014/0092007 A1* | 4/2014 | Kim | H04N 21/42203 |
| | | | 345/156 |
| 2014/0163978 A1* | 6/2014 | Basye | G10L 15/28 |
| | | | 704/233 |
| 2014/0195248 A1* | 7/2014 | Chung | G10L 15/22 |
| | | | 704/275 |
| 2014/0261780 A1* | 9/2014 | Thomas | E03C 1/057 |
| | | | 137/801 |
| 2015/0142704 A1* | 5/2015 | London | G06Q 10/10 |
| | | | 706/11 |
| 2015/0262577 A1* | 9/2015 | Nomura | G10L 15/22 |
| | | | 704/231 |
| 2015/0308084 A1* | 10/2015 | Thompson | E03C 1/055 |
| | | | 700/283 |
| 2015/0308089 A1* | 10/2015 | Thompson | G05B 15/02 |
| | | | 137/78.1 |
| 2015/0322652 A1 | 11/2015 | Mazz et al. | |
| 2015/0368887 A1* | 12/2015 | Esche | E03C 1/0404 |
| | | | 137/315.01 |
| 2016/0063989 A1* | 3/2016 | Deleeuw | G06F 3/167 |
| | | | 345/473 |
| 2016/0077530 A1* | 3/2016 | Moran | E03C 1/055 |
| | | | 700/282 |
| 2016/0258144 A1 | 9/2016 | Tayenaka et al. | |
| 2016/0289932 A1* | 10/2016 | Mirakhimov | E03C 1/0401 |
| 2016/0328880 A1* | 11/2016 | Sajapuram | H04N 5/232127 |
| 2016/0334807 A1 | 11/2016 | Song | |
| 2017/0053651 A1* | 2/2017 | Lim | G10L 15/20 |
| 2017/0186428 A1* | 6/2017 | Kunitake | G10L 17/06 |
| 2017/0260722 A1 | 9/2017 | Horwitz et al. | |
| 2017/0268208 A1* | 9/2017 | LaMarche | G05D 23/1393 |
| 2018/0216324 A1 | 8/2018 | Beck et al. | |
| 2018/0216325 A1 | 8/2018 | Chen | |
| 2018/0244541 A1 | 8/2018 | Pirutin | |
| 2020/0123747 A1 | 4/2020 | Frackelton | |
| 2020/0299941 A1 | 9/2020 | Veros et al. | |
| 2020/0339438 A1* | 10/2020 | Lautzenheiser | G09F 13/08 |

FOREIGN PATENT DOCUMENTS

| | | |
|---|---|---|
| EP | 2843657 A2 | 3/2015 |
| JP | 2020124691 A | 8/2020 |
| WO | 2016/040986 A1 | 3/2016 |

OTHER PUBLICATIONS

International Search Report and Written Opinion for Application No. PCT/US2017/067896 mailed May 24, 2018.

\* cited by examiner

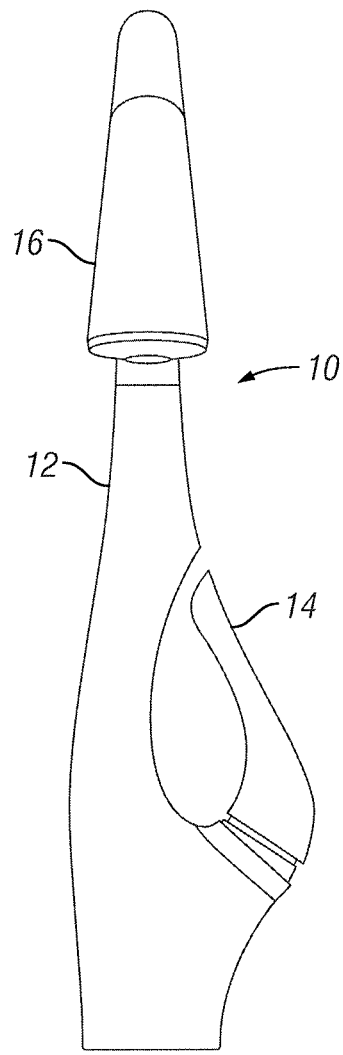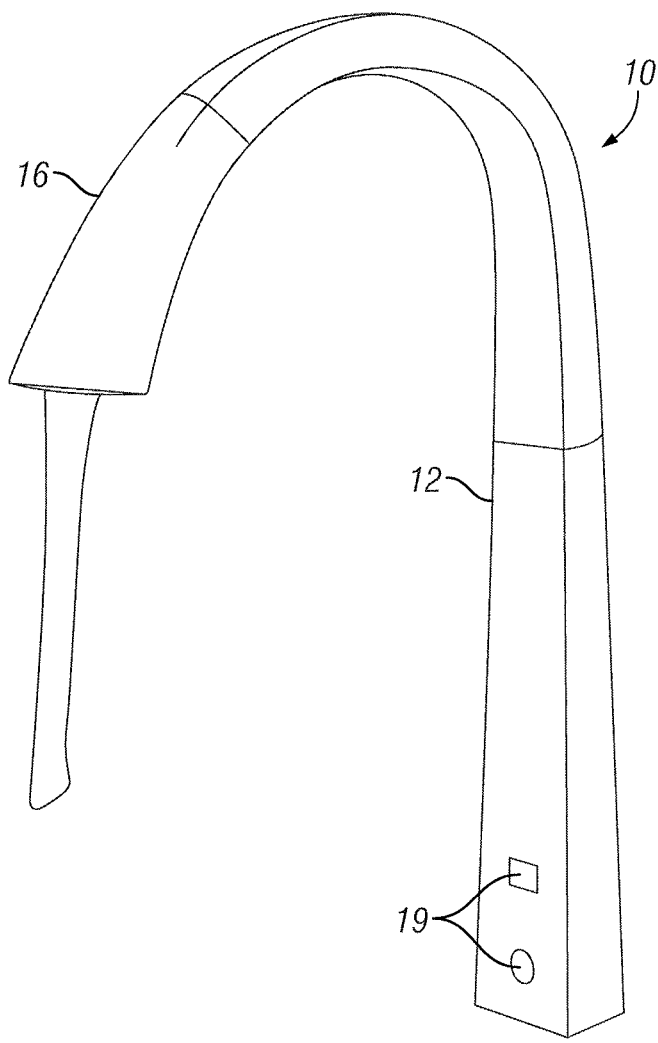
FIG. 1D  FIG. 1E

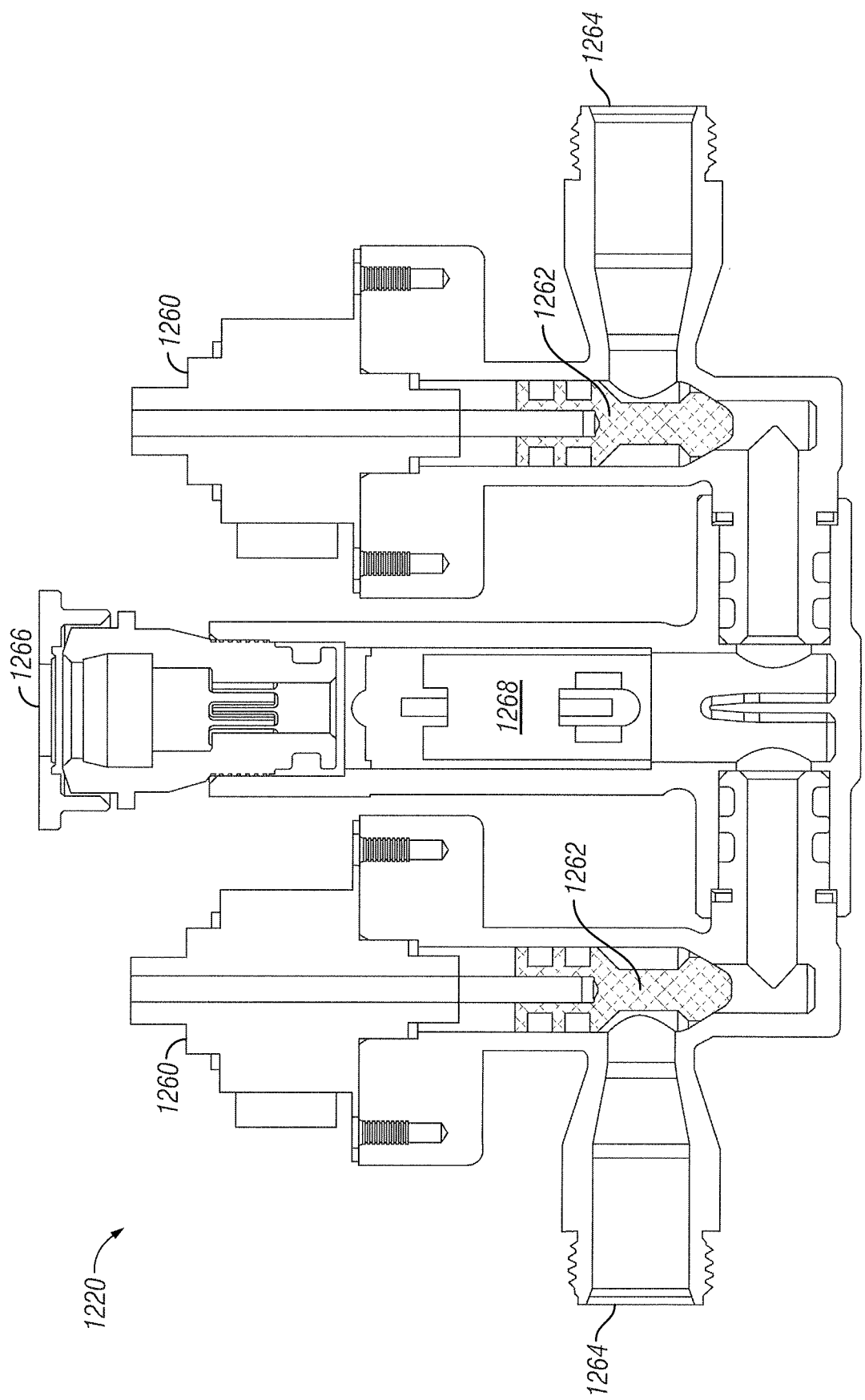

ELECTRONIC FAUCET WITH SMART FEATURES

CROSS REFERENCE TO RELATED APPLICATION

This application is a continuation of U.S. application Ser. No. 16/007,846, filed Jun. 13, 2018, now U.S. Pat. No. 10,937,421; which is continuation in part of U.S. application Ser. No. 15/851,445, filed Dec. 21, 2017; which claims the benefit of U.S. Provisional Patent Application No. 62/438,492, filed Dec. 23, 2016, the disclosures of which are hereby incorporated by reference in their entirety. U.S. application Ser. No. 16/007,846 also claims the benefit of U.S. Provisional Patent Application No. 62/518,652, filed Jun. 13, 2017; and U.S. Provisional Patent Application No. 62/529,561, filed Jul. 7, 2017, the disclosures of which are hereby incorporated by reference in their entirety.

TECHNICAL FIELD

The present disclosure relates generally to faucets. In particular, the present disclosure relates to a faucet that is electronically controlled, for example, based on the spatial orientation of an input device or based on voice controls.

BACKGROUND

Faucets typically comprise mechanical parts to control the temperature and flow of water. In many situations, a mechanical valve controls the hot and cold water inlets through one or more faucet handles. Typically, a user manipulates the mechanical valve to adjust hot/cold mix and water flow by maneuvering faucet handle(s). Due to the mechanical connection between the handle and valve, the faucet body typically must be sized to accommodate these mechanical components. The bulk of these components presents challenges in faucet designs.

With kitchen faucets, for example, attempts have been made to slim down the faucet body to create a more aesthetically pleasing design, but even these slim designs are dictated to a great extent by the need to include the mechanical valve in the faucet body, which is necessary to manipulate the temperature and flow of water. As a result, many components of kitchen faucets, such as the mechanical valve, are located above the kitchen countertop. This can make kitchen faucets bulky to some extent to allow room for the mechanical components.

SUMMARY

According to the present disclosure, a faucet is provided that electrically controls the temperature and flow of water dispensed. In some embodiments, the faucet illustratively includes a faucet body and a faucet handle. In some embodiments, such as some embodiments described herein with reference to voice control, the faucet illustratively includes a faucet body but not a faucet handle. In illustrative embodiments, the faucet includes an inertial motion unit sensor that is mounted in the faucet handle to sense spatial orientation of the faucet handle. For example, in some embodiments, the faucet handle may include a sensor that detects where the faucet handle is located in relation to an initial position. This allows the faucet to detect the position of the faucet handle after maneuvering the faucet handle similar to how a user would maneuver a mechanical faucet handle.

In illustrative embodiments, the faucet includes an electronic flow control system that adjusts flow volume and temperature of water being dispensed. In an illustrative embodiment, the faucet includes a controller configured to receive the signals from the inertial motion unit sensor and control the electronic flow control system to adjust flow volume and temperature of water being dispensed based upon the position of the faucet handle.

According to the present disclosure, a faucet is provided that electrically controls the temperature and flow of water dispensed. In illustrative embodiments, the faucet includes an electronic flow control system that adjusts flow volume and temperature of water being dispensed. In an illustrative embodiment, the faucet includes a controller configured to receive the signals from the inertial motion unit sensor and control the electronic flow control system to adjust flow volume and temperature of water being dispensed based upon the position of the faucet handle.

In illustrative embodiments, the faucet includes an acoustic array that provides mid-air tactile feedback and a motion controller that provides gesture feedback as inputs to the electronic flow control system.

Additional features of the present disclosure will become apparent to those skilled in the art upon consideration of illustrative embodiments including the best mode of carrying out the disclosure as presently perceived.

Additional features of the present disclosure will become apparent to those skilled in the art upon consideration of illustrative embodiments including the best mode of carrying out the disclosure as presently perceived.

BRIEF DESCRIPTION OF THE FIGURES

The detailed description makes reference to the accompanying figures in which:

FIG. 1D is a perspective view of an example kitchen faucet according to an embodiment of the disclosure;

FIG. 1E is a perspective view of an example voice-controlled kitchen faucet according to an embodiment of the disclosure;

FIG. 13 is a cross-section view of the flow control box of FIG. 12;

DETAILED DESCRIPTION

Figure 1A:
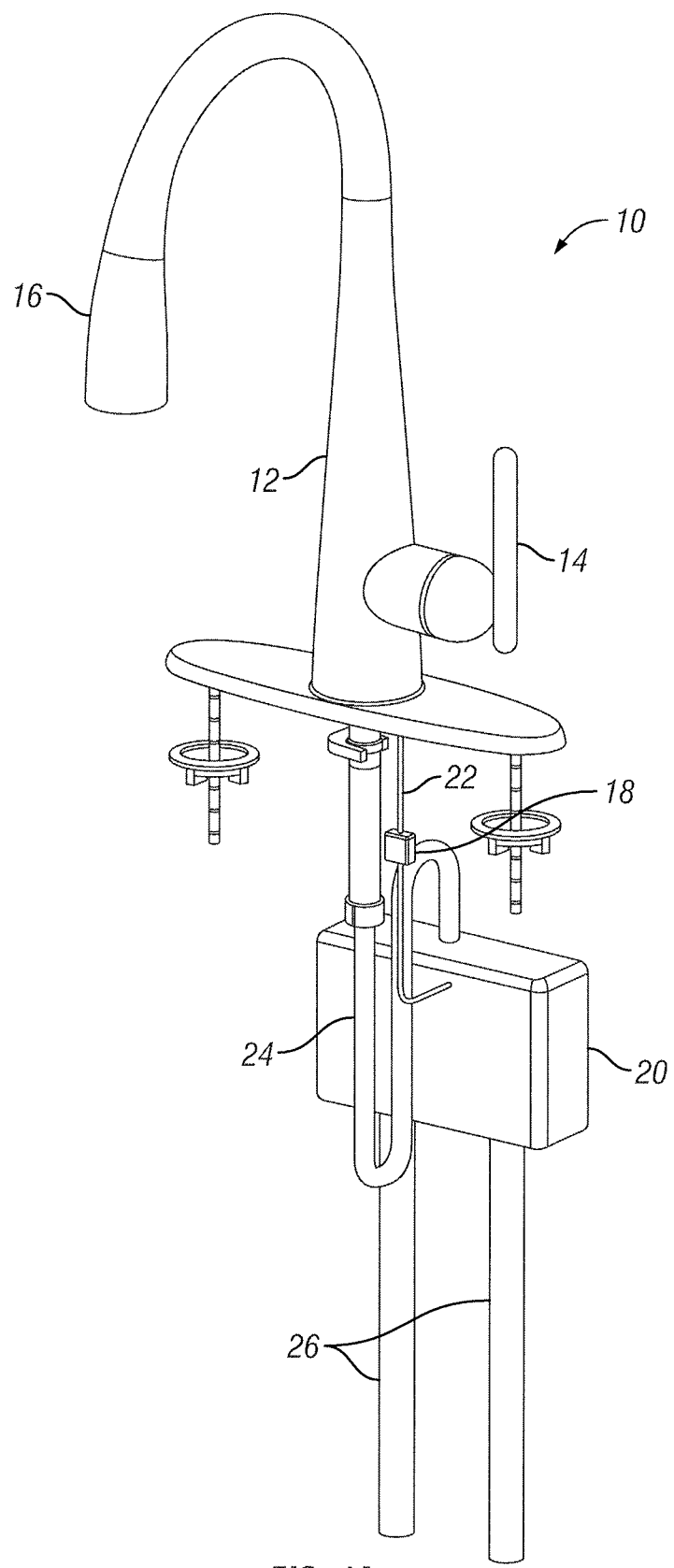
FIG. 1A is a perspective view of an example kitchen faucet according to an embodiment of the disclosure.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1A shows an example faucet 10 according to an embodiment of this disclosure. Although this disclosure will be discussed with regard to a kitchen faucet for purposes of example, the control system described herein could be implemented in any type of faucet, including bathroom faucets, whether the faucet has a single handle or two handles. Although the faucet 10 is shown as a pull-down kitchen faucet for purposes of example, this disclosure encompasses other types of faucets, including but not limited to, pull-out faucets. In the example shown, the faucet 10 includes a faucet body 12, a faucet handle 14, and a spray head 16 that can be detached or undocked from the faucet body 12. The faucet body 12 can be shaped differently to provide a different connection with the faucet handle 14 or spray head 16. For example, in another embodiment, the faucet body 12 could be flush with the faucet handle 14 to provide a more streamlined appearance that reduces the space required by the faucet 10. In another embodiment, the faucet handle 14 does not need to be connected directly to the faucet body 12, but could be remote from the faucet body 12.

As shown, the faucet 10 can be manually controlled (e.g., the temperature, water flow, and on/off) using the handle 14. In some cases, the faucet 10 could be manually adjusted electronically, such as using a hands-free sensor, touch activation, buttons, or other interface. As discussed more below, the handle 14 can detect its spatial orientation and send signals to a controller 18 to control water flow using a flow control box 20 through signal wires 22.

As discussed further herein, the faucet 10 can also be electronically controlled using voice and/or speech control. The terms "voice control" and "voice recognition" are used interchangeably to mean broadly a feature of the faucet for identifying a user based on a user's spoken words. With respect to voice recognition, for example, the faucet could have user-based presets for temperature, flow, volume, filtering, and/or other faucet controls based on an identification of the user using voice recognition. In one embodiment, for example, the faucet could have a user-based preset for a volume dispensed for a container of water. For example, User 1 could have a 20-ounce preset in response to a command to "Dispense water into my tumbler" while User 2 could have a 32-ounce preset for the same command. The faucet could include voice recognition to identify which user stated the command and dispense a volume of water consistent with that user's preset. The faucet could also include speech recognition to parse a user's spoken words into a command to be executed by the faucet. For example, the faucet's speech recognition could interpret between commands "Dispense 8 ounces of water" and "Dispense water at 150 degrees." In some cases, voice recognition and speech recognition could be used in tandem. For example, the faucet could use voice recognition to understand a preset volume for the command "Dispense water into my tea cup" while speech recognition would parse the spoken words into a command recognizable by the faucet. Throughout the specification, the examples may describe only voice recognition or only speech recognition for purposes of simplifying the disclosure, but it should be appreciated that the faucet could include both voice recognition and speech recognition in each of these examples depending on the circumstances.

In the embodiment shown in FIG. 1A, the flow control box 20 is connected to a pull down hose 24 to provide fluid communication from water supply inlet hoses 26 to spray head 16. As is typical, the water supply inlet hoses 26 can supply cold and hot water to be released from the spray head 16.

Figure 1B:
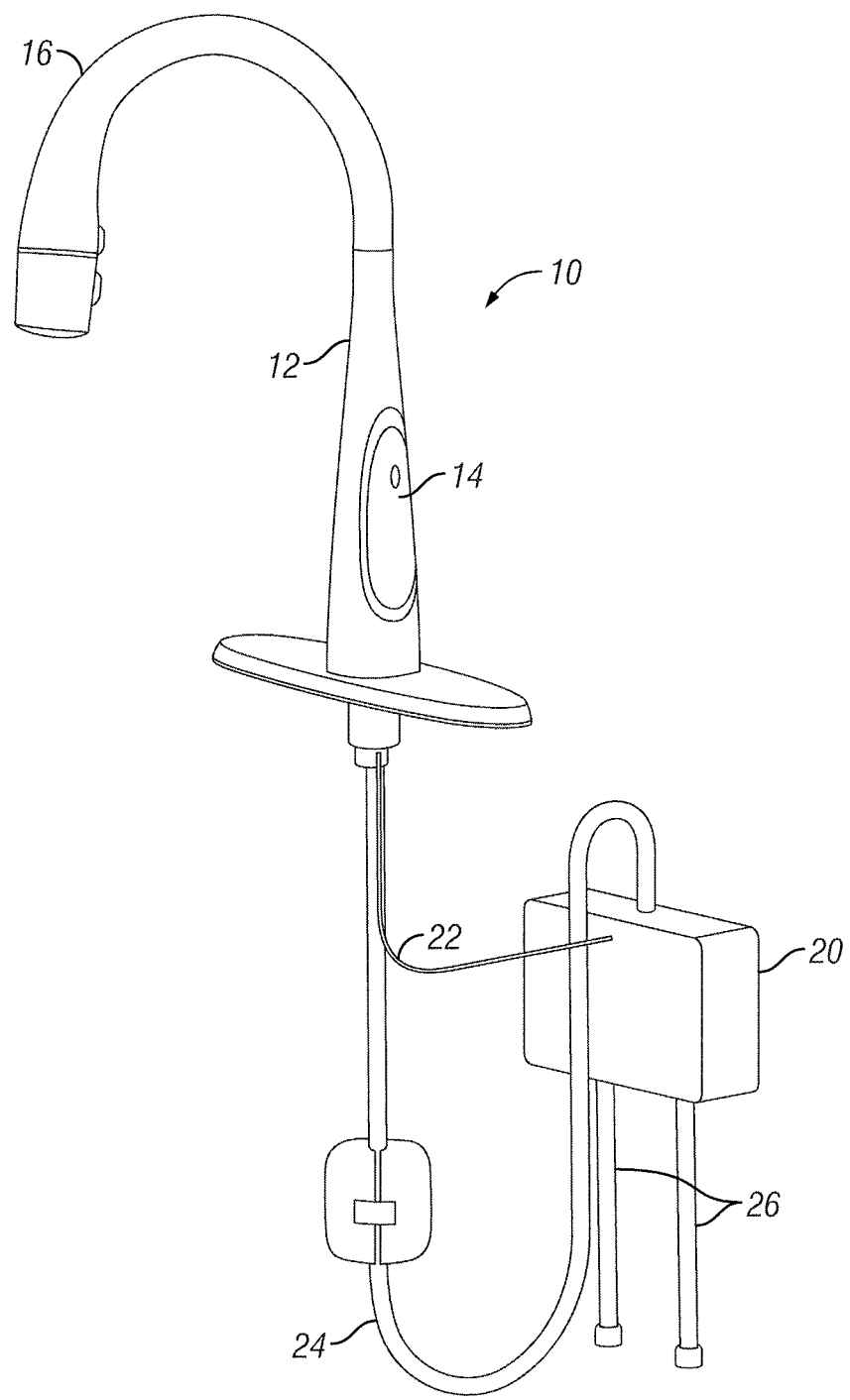
FIG. 1B is a perspective view of an example kitchen faucet according to an embodiment of the disclosure.
Figure 1C:
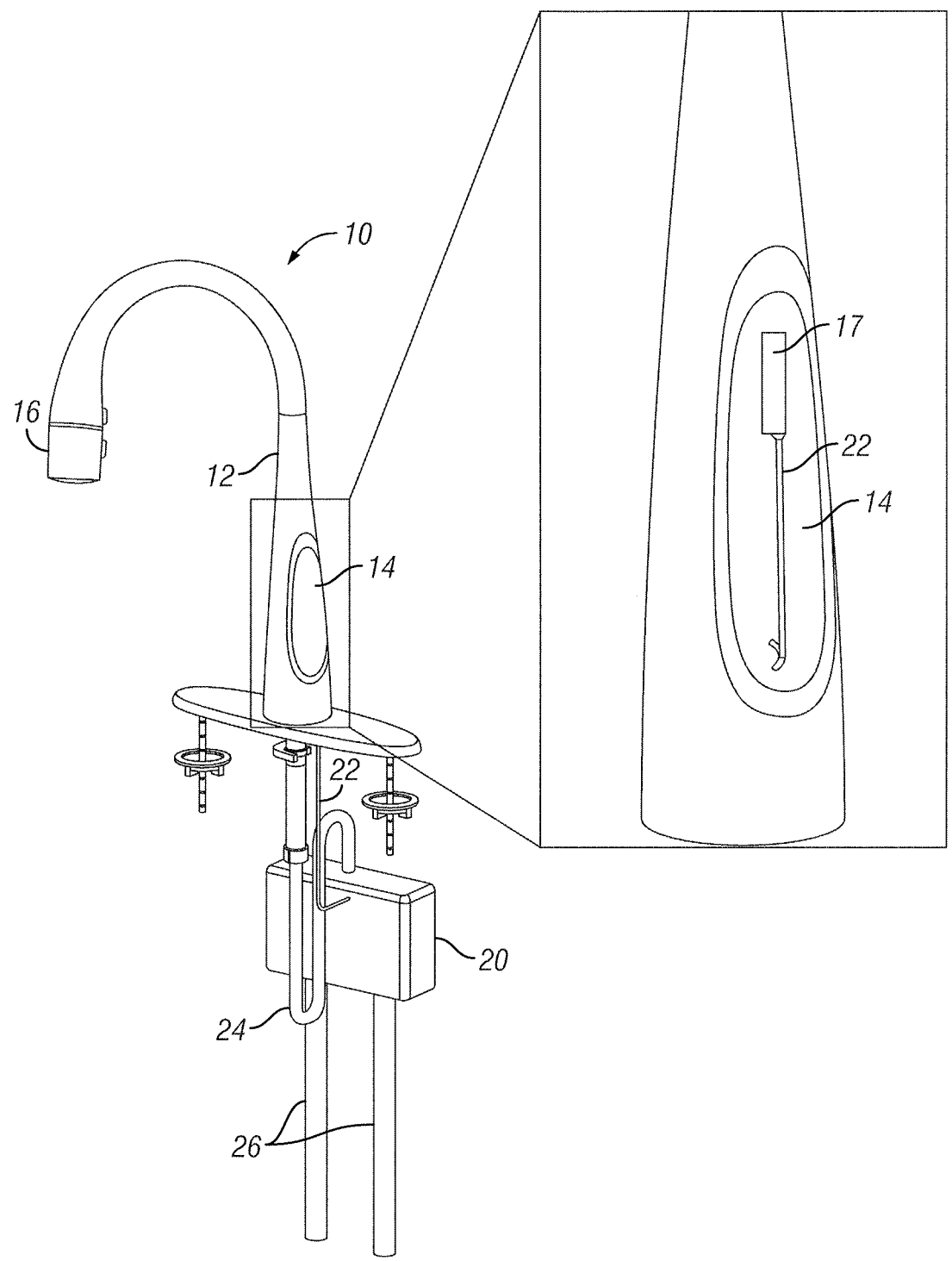
FIG. 1C is a perspective view of the example kitchen faucet of FIG. 1B further illustrating an exploded view of the faucet handle.

FIG. 1B is a perspective view of an example kitchen faucet according to an embodiment of the disclosure. FIG. 1C is a perspective view of the example kitchen faucet of FIG. 1B further illustrating an exploded view of the faucet handle with a cut-out showing some components. In the example shown in FIGS. 1B and 1C, the faucet 10 includes a faucet body 12, a faucet handle 14, and a spray head 16 that can be detached or undocked from the faucet body 12. The faucet handle 14 may be substantially or fully integrated into the faucet body 12. The handle 14 may detect its spatial orientation and send signals to a controller 18 to control water flow using a flow control box 20 through signal wires 22. Additionally or alternatively, as shown in the cut-out portion of the faucet handle 14, the faucet 10 may include circuitry 17, such as control circuitry (e.g., microcontrollers, processors, or other embedded systems), networking circuitry, sensors and sensor circuitry (e.g., IMUs, microphones, speakers, flow, pressure, temperature, hall effect, etc.), or other circuitry. The circuitry 17 may be coupled to the signal wire 22 that in turn may be coupled to the controller 18 or other control circuitry.

FIG. 1D is a perspective view of an example kitchen faucet according to an embodiment of the disclosure. In the example shown in FIG. 1D, the faucet 10 includes a faucet body 12, a faucet handle 14, and a spray head 16 that can be detached or undocked from the faucet body 12.

FIG. 1E is a perspective view of an example voice-controlled kitchen faucet according to an embodiment of the disclosure. In the example shown in FIG. 1E, the faucet 10 includes a faucet body 12, a spray head 16 that can be detached or undocked from the faucet body 12, and an interface 19. In some embodiments like the example shown in FIG. 1E, the faucet 10 does not include a faucet handle 14 because it is otherwise controlled (e.g., via voice commands). In some embodiments, the interface 19 is integrated within the faucet body 12. FIG. 1E illustrates an interface 19 with two icons (a sink icon and a logo icon) illuminated for purposes of example. When the interface 19 is not illuminating icons, the faucet body 12 may appear to be a single integrated piece without any interface 19. Thus, the interface 19 may be seen only when one or more portions of the interface 19 are illuminated or otherwise actuated. As an example, the faucet body 12 may look like a single piece of brushed chrome when the interface 19 is not illuminated or actuated. In some embodiments (e.g., when the faucet 10 receives a command or voice command), an LED may be illuminated on the interface 19 and light may show through the faucet body 12 (e.g., in the shape of an icon) like a one-way screen.

Figure 2:
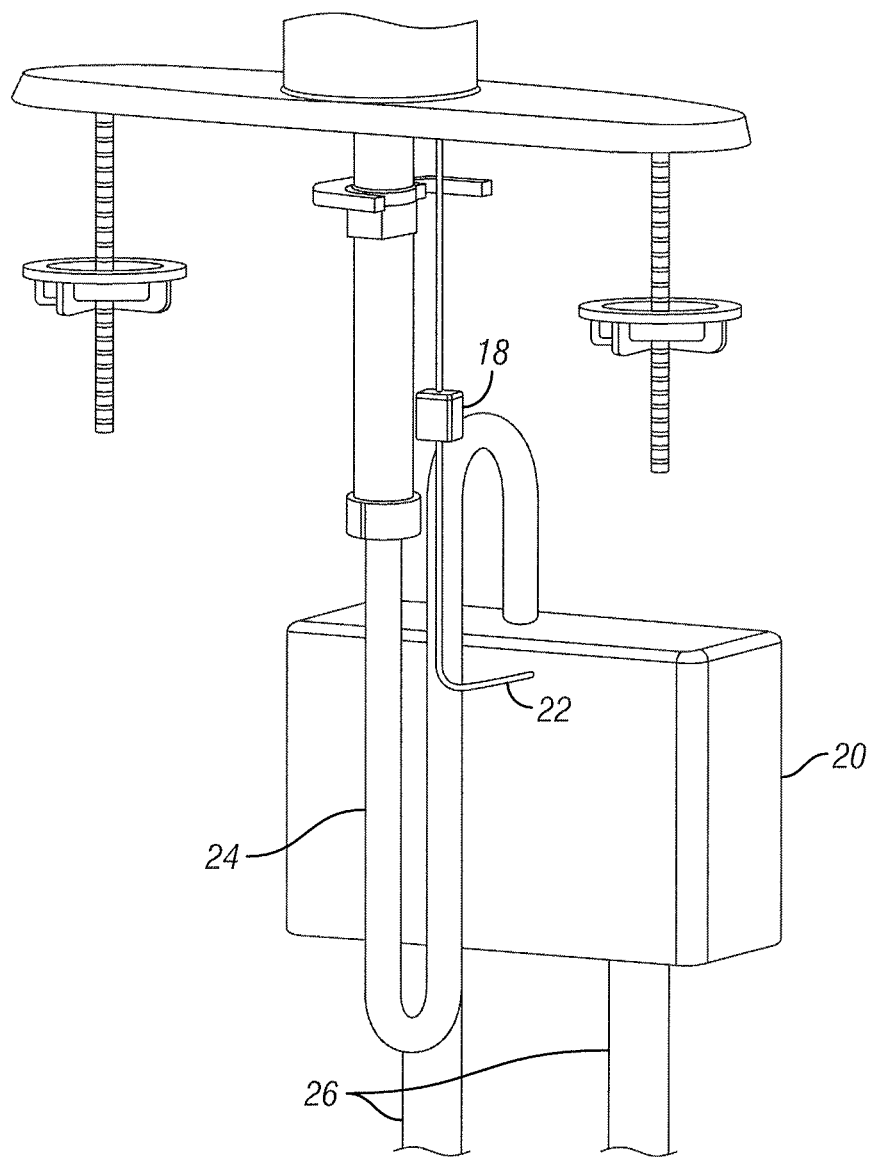
FIG. 2 is a detailed perspective view of the example kitchen faucet shown in FIG. 1A below a countertop.

Referring to FIG. 2, a closer look to the components of the faucet 10 under the countertop (not shown) is provided. As mentioned above, in one embodiment shown, the controller 18 is connected to the flow control box 20 through signal wires 22 to analyze the signals sent from faucet handle 14 to control the flow of water from the water supply inlet hoses 26. The flow control box 20 can mix the water from water supply inlet hoses 26 to provide a water flow of a user-selected temperature to be released from the spray head 16. The flow control box 20 as shown is located under the countertop of the faucet 10. The flow control box 20 can be located elsewhere as appropriate to receive signals from controller 18 through signal wires 22 and provide water to be released from spray head 16 through pull down hose 24. The flow control box 20 can be located in a different position to provide more space underneath the countertop of faucet 10 depending on the circumstances.

In the example shown, the controller 18 is located outside of the flow control box 20. In another embodiment, the controller 18 can also be located inside of the flow control box 20. In another embodiment, the controller 18 can be located above the countertop of the faucet 10. The controller 18 could also be located inside the faucet handle 14.

The connection between the faucet handle 14, controller 18, and flow control box 20 is shown as a wired connection through signal wires 22. In another embodiment, the communication between the faucet handle 14, controller 18, interface 19, and/or flow control box 20 can be done wirelessly.

Figure 3:
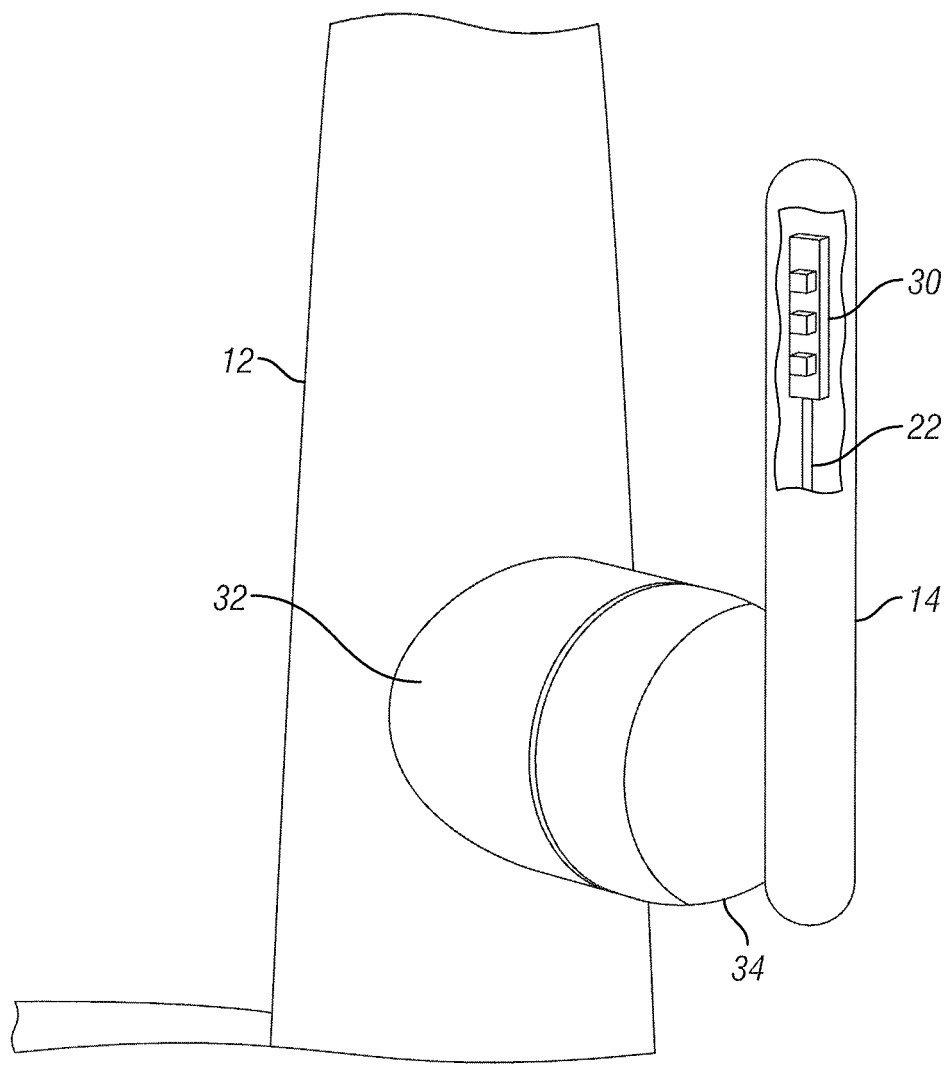
FIG. 3 is a detailed perspective view of a faucet handle of the example kitchen faucet of FIG. 1A with a breakaway to reveal the internals of the faucet handle according to an embodiment of the disclosure.

Referring to FIG. 3, a closer look at the faucet handle 14 is provided. There is a cut away to reveal the components inside of the faucet handle 14. In the example shown, the faucet handle 14 includes a sensor printed circuit board assembly (PCBA) 30 connected to the signal wire 22. As shown, the faucet handle 14 is connected to the faucet body 12 through a stationary faucet handle mount 32 in conjunction with a movable faucet handle mount 34. The stationary faucet handle mount 32 is connected to the faucet body 12. The stationary faucet handle mount 32 can be a part of the faucet body 12. The movable faucet handle mount 34 is movably connected to the stationary faucet handle mount 32. The movable faucet handle mount 34 is also connected to the faucet handle 14. The movable faucet handle mount 34 can be a part of the faucet handle 14. The connection between the stationary faucet handle mount 32 and the movable faucet handle mount 34 allows the faucet handle 14 to move at least rotationally along two axes of rotation. In one embodiment, one axis of rotation can represent the water flow being released from the spray head 16, and the other axis of rotation can represent the temperature of water being released from the spray head 16. Although the stationary faucet handle mount 32 and the movable faucet handle mount 34 extend from the faucet body 12 in the example shown, these components could be integral with the faucet body 12 to provide more flexibility for shape and size of the faucet body 12.

In one embodiment, the faucet handle 14 can be movably connected to the faucet body 12 without the stationary faucet handle mount 32 and the moveable faucet handle mount 34. The faucet handle 14 can also be movably connected to the spray head 16. As discussed above, the faucet handle 14 can be separate from the faucet body 12 altogether and be movably connected to a surface for movement along two axes of rotation.

The sensor PCBA 30 is configured to detect the spatial orientation of the faucet handle 14. In one embodiment, the sensor PCBA 30 is an inertial motion unit (IMU) sensor 30. The sensor PCBA 30 can send signals through signal wires 22 to controller 18 to interpret the signals. After the controller 18 determines a spatial orientation of the faucet handle 14 through the signals provided from sensor PCBA 30, the controller 18 can send signals to the flow control box 20 and control the water temperature and the water flow to be released from the spray head 16.

Figure 4:
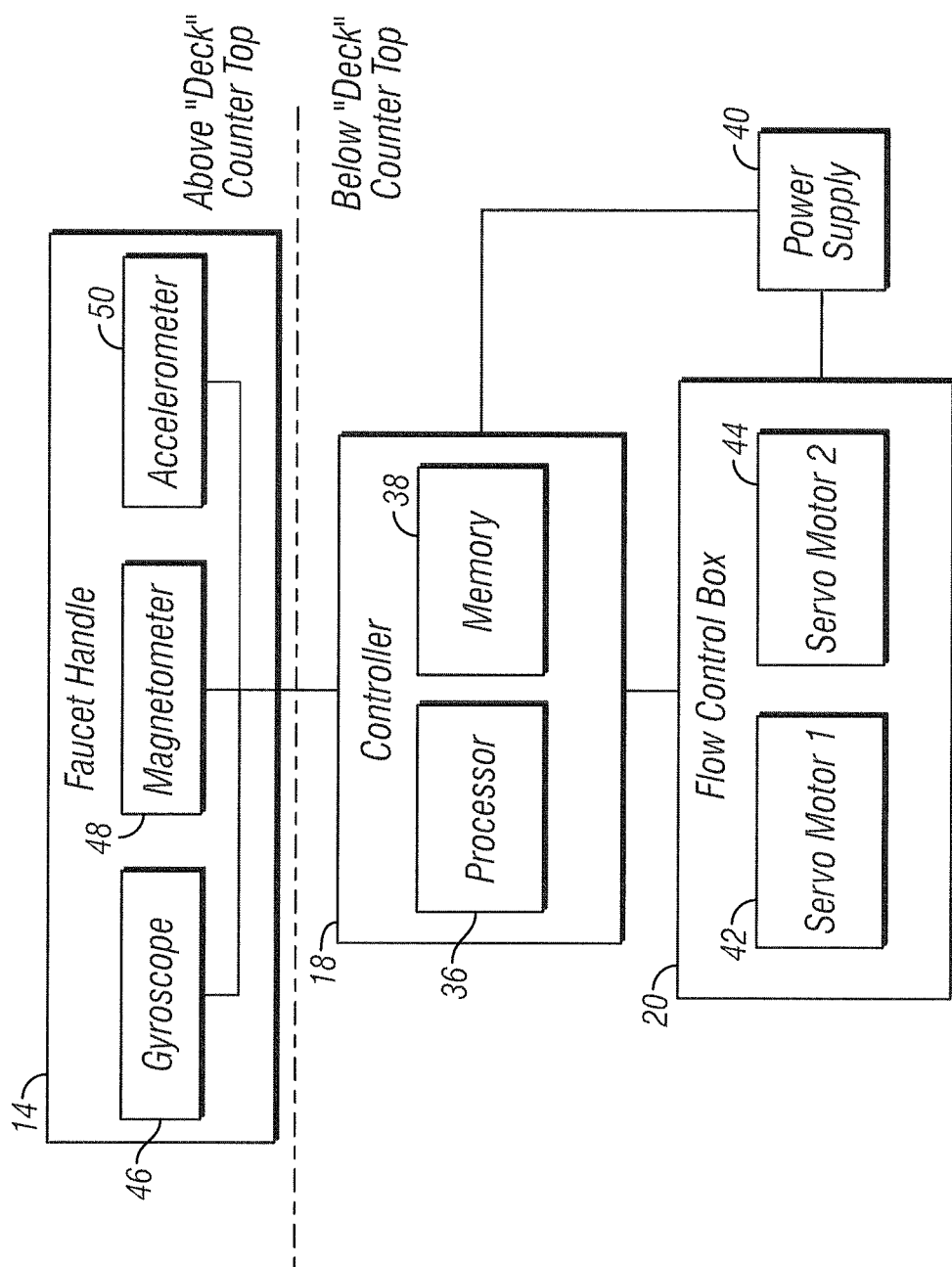
FIG. 4 is a simplified block diagram of an example control system for controlling dispensing of water from a kitchen faucet according to an embodiment of the disclosure.

Referring to FIG. 4, there is shown an example electronic control system for controlling dispensing of water from the faucet 10. In the example shown, the control system includes the controller 18 including a processor 36 to process the signals received from the faucet handle 14 to send a signal to the flow control box 20 and a memory 38 to store instructions to be executed by the processor 36. The controller 18 may also be connected to circuitry 17 (shown in FIG. 1C). The control system also includes a power supply 40 that is connected to the controller 18 and the flow control box 20.

The control system also includes the flow control box 20 including a servo motor one 42 and a servo motor two 44 to control the water received from water supply inlet hoses 26 (not shown) to output water of a determined flow rate and a determined temperature based upon the spatial orientation of the faucet handle 14. Servo motor one 42 may be a servo motor for the control of cold water into the system. Servo motor two 44 may be a servo motor for the control of hot water into the system.

In some embodiments, the control system additionally or alternatively includes a faucet handle 14 (or other componentry) that receives inputs from at least one of a gyroscope 46, magnetometer 48, and accelerometer 50 of the sensor PCBA 30 (FIG. 3). In some embodiments, the control system additionally or alternatively includes circuitry 17 (e.g., a microphone or networking circuitry) that receives inputs (e.g., a voice command).

In one embodiment, the faucet handle 14 is located above the countertop and the controller 18, flow control box 20, and power supply 40 are located below the countertop. The components of the control system may be arranged above and below the countertop as appropriate. The power supply 40 provides power to the faucet handle 14 through the controller 18. In another embodiment, the power supply 40 may be connected directly to the faucet handle 14. The power supply 40 can be power supplied from an outlet and converted as necessary for use by the controller 18, flow control box 20, and faucet handle 14. The flow control box 20 may have a separate power supply 40 than the controller 18. The power supply 40 may be any power source to supply electrical power for the function of the faucet handle 14, controller 18, and the flow control box 20.

In one embodiment, the faucet handle 14 detects its spatial orientation through the use of at least one of the gyroscope 46, the magnetometer 48, and accelerometer 50. In another embodiment, the faucet handle 14 may use other sensors to detect its spatial orientation. The faucet handle 14 can send the signals received from the sensors 46, 48, 50 to the controller 18 to use an algorithm in order to determine the temperature of water and the flow rate of the water to be released from the spray head 16. In another embodiment, the controller 18 may use a look-up table to determine the temperature of water and the flow rate of the water to be released from the spray head 16. After determining the temperature and flow rate of the water, the controller 18 can send a signal to flow control box 20 to control the servo motor one 42 and servo motor two 44 to adjust the temperature and flow rate of the water being dispensed from the spray head 16. The flow control box 20 receives hot and cold water from the water supply inlet hoses 26 to output the water of a desired temperature and flow rate through the pull down hose 24 to the spray head 16.

In another embodiment, flow control box 20 may use more than two servo motors in order to control the temperature and flow rate of the water. The flow control box 20 may also use a series of solenoids, needle valve, stepper motor, etc. in order to control the temperature and flow rate of the water depending on the circumstances.

Figure 5:
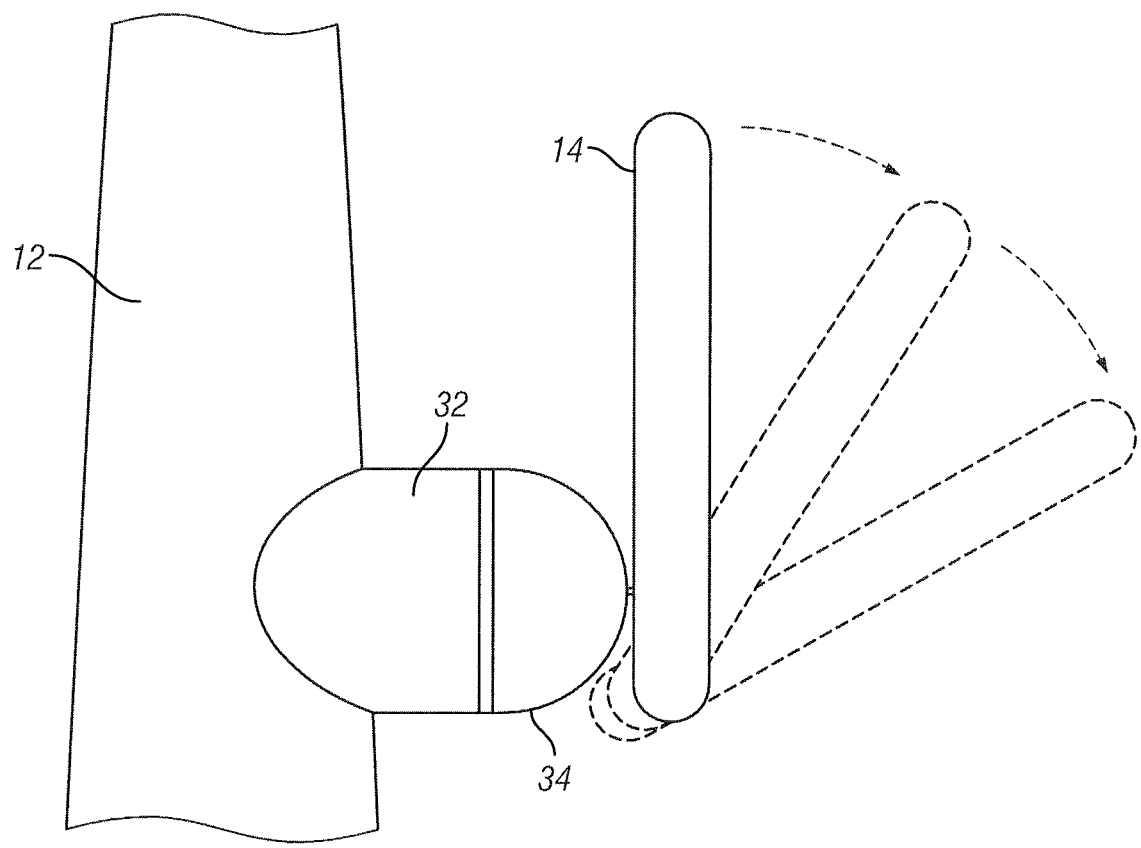
FIG. 5 is a front view of the faucet handle showing the degrees of rotation that the faucet handle can travel along one axis of the faucet handle according to an embodiment of the disclosure.

Referring to FIG. 5, there is shown progressive movement of the faucet handle 14 from an initial position where no water is being released to a fully extended position where the flow rate of water is at a maximum. In the example shown, the faucet body 12 is connected to the stationary faucet handle mount 32. The movable faucet handle mount 34 is movably connected to the stationary faucet handle mount 32. The faucet handle 14 is connected to the movable faucet handle mount 34 so a user can maneuver the faucet handle 14 along one axis as shown in relation to the faucet body 12.

In the shown embodiment, there are three different positions as the faucet handle 14 starts from an initial position rotating all the way to the fully extended position in phantom. In another embodiment, there may be a plurality of positions that the faucet handle 14 can achieve between an initial position to a fully extended position. In one embodiment, as the faucet handle 14 is rotated in the way shown in FIG. 5, the faucet handle 14 sends signals to the controller 18 to control the flow control box 20 to release more water of a temperature determined as discussed below. In one embodiment, the faucet 10 does not release any water when the faucet handle 14 is in the initial position. The faucet 10 begins to release water of variable amounts when the faucet handle 14 is rotated from the initial position depending on the position of the faucet handle 14. The sensor PCBA 30 detects the position using the gyroscope 46, the magnetometer 48, and/or the accelerometer 50 and sends signals to the controller 18 to determine how much water is to be released. The controller 18 then sends a signal to the flow control box 20 to release water of a determined flow rate out of the pull down hose 24 to the spray head 16 through the use of the servo motors 42, 44.

Figure 6:
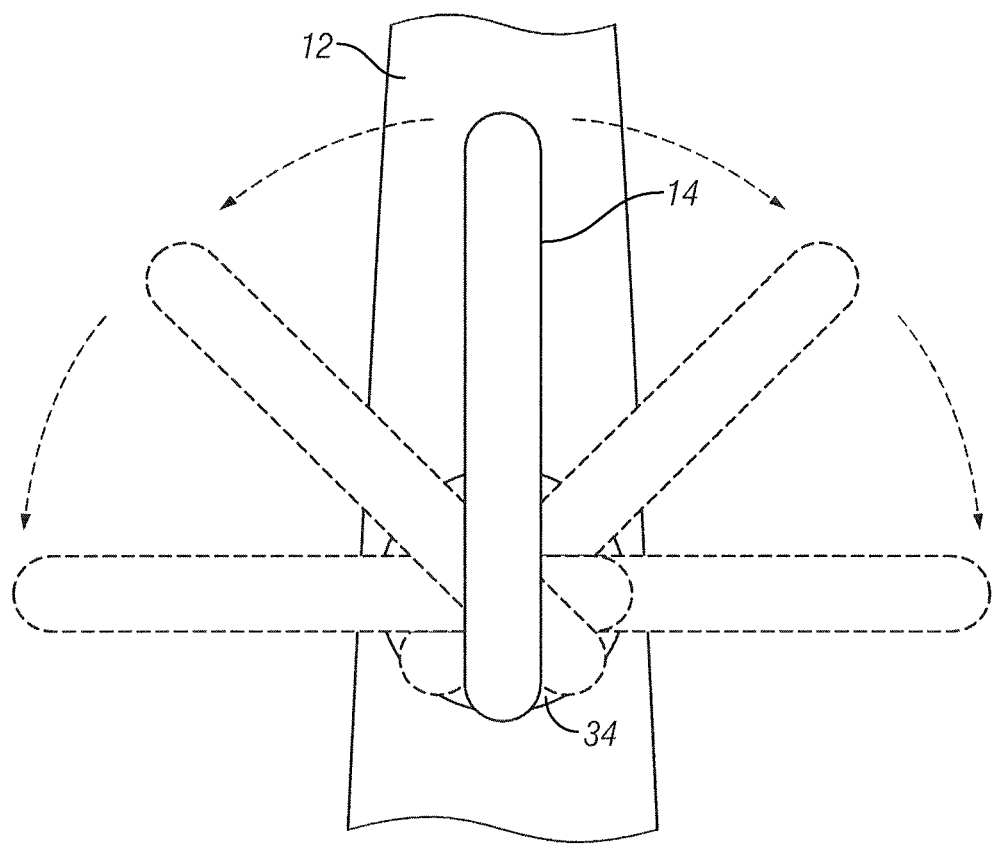
FIG. 6 is a side view of the faucet handle showing the degrees of rotation that the faucet handle can travel along another axis of the faucet handle according to an embodiment of the disclosure.

Referring to FIG. 6, there is shown rotation of the faucet handle 14 from an initial position to one side and from the initial position to the other side. In the example shown, the faucet handle 14 is connected to the movable faucet handle mount 34 that connects to the stationary faucet handle mount 32 (FIG. 3) which is connected to the faucet body 12. The connections allow the faucet handle 14 to rotate as shown. There is one initial position of the faucet handle 14 and four other positions shown in phantom. In another embodiment, there is a plurality of positions that the faucet handle 14 can achieve between the fully extended left position to the fully extended right position.

In one embodiment, as the faucet handle 14 is rotated along the axis of rotation, the temperature of water the flow control box 20 releases to the pull down hose 24 connected to the spray head 16 changes. The faucet handle 14 detects its position using the sensor PCBA 30 and sends a signal to the controller 18. The controller 18 determines a temperature of the water to be released from the spray head 16 depending on the spatial orientation of the faucet and sends a signal to the flow control box 20 to output water of a certain temperature and flow rate through the pull down hose 24 to the spray head 16 as discussed above. The flow control box 20 can control the servo motors 42, 44 to release a specific amount of cold and hot water from the water supply inlet hoses 26 to achieve the desired temperature for the water released from the pull down hose 24 to the spray head 16.

In one embodiment, the fully extended left position of the faucet handle 14 could be for the release of the hottest water available. The fully extended right position of the faucet handle 14 can be for the release of the coldest water available. The initial position of the faucet handle 14 can be for the release of an even mix of hot and cold water available. The positions in between the fully extended left position of the faucet handle 14 and the fully extended right position of the faucet handle 14 can be varying mixes of hot and cold water to achieve relatively cold water or relatively hot water. The water can become progressively colder or hotter depending on which direction the faucet handle 14 is rotating towards. In another embodiment, the cold and hot directions may be switched so the fully extended left position of the faucet handle 14 can be for the release of the coldest water available and the fully extended right position of the faucet handle 14 can be for the release of the hottest water available.

Figure 7:
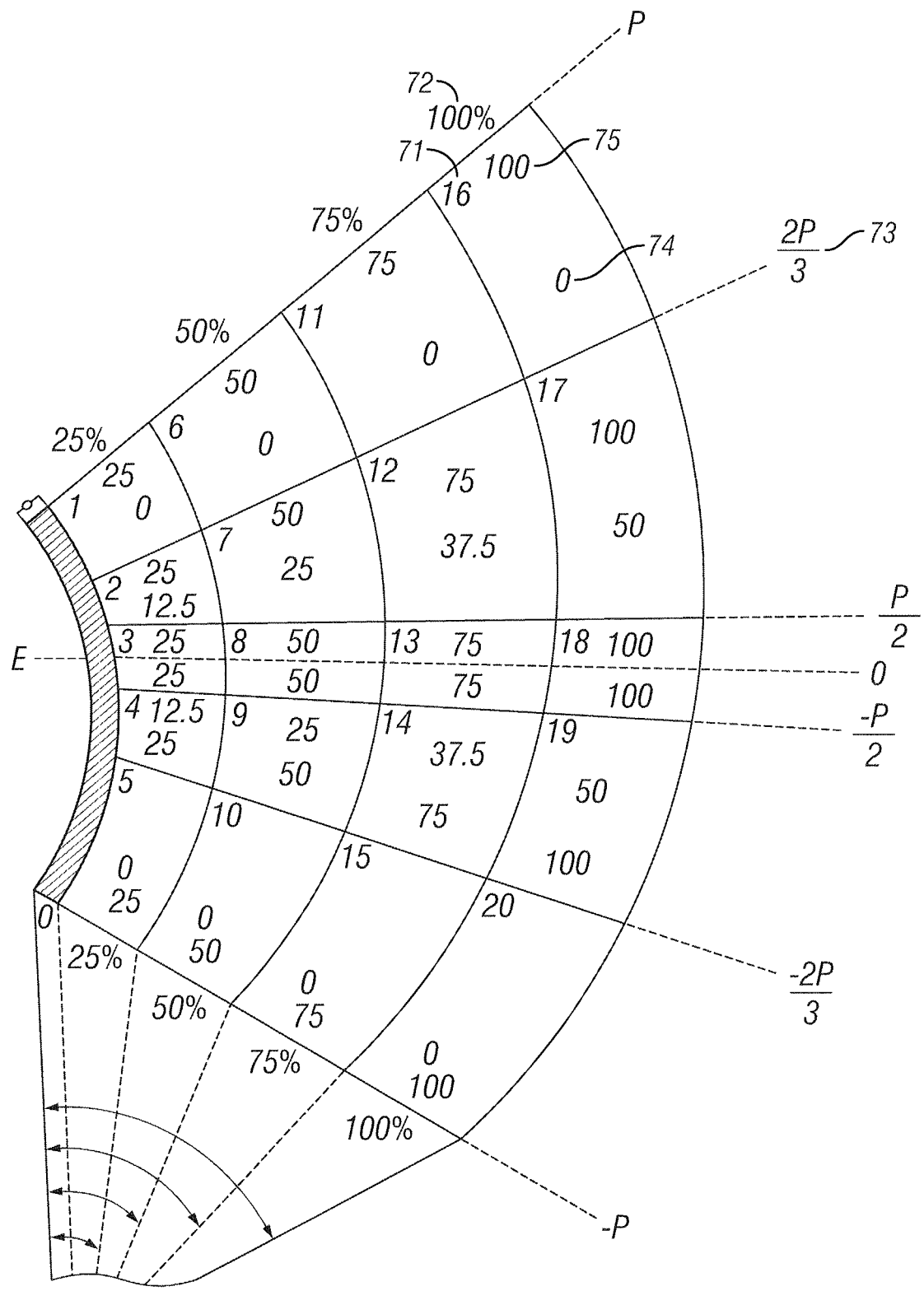
FIG. 7 is a simplified diagram of water values released from two water supply inlet hoses given a position of the faucet handle according to an embodiment of the disclosure.

Referring to FIG. 7, a table is shown that shows an example distribution of water from water supply inlet hoses 26 released through flow control box 20. The table covers the range of motion available for the faucet handle 14. The sections are labeled with section numbers 71 and are located along a spectrum of percentage water flow 72 and a temperature turn value 73. The sections further include a value for the servo motor one water inlet 74 and a value for the servo motor two water inlet 75. In one embodiment, the value for the servo motor one inlet 74 can represent the cold water value and the value for the servo motor two inlet 75 can represent the hot water value. In another embodiment, the servo motor values 74, 75 may be switched so that the value for servo motor one inlet 74 represents the hot water value and the value for servo motor two inlet 75 represents the cold water value. In the shown example, the percentage of water flow 72 ranges from 0to 100% with four divisions. In one embodiment, the percentage of water flow 72 can be 25%, 50%, 75%, and 100%. In another embodiment, the percentage of water flow 72 may be divided in any way between 0to 100%.

The temperature turn value 73 can represent the amount of rotation that is achieved for the faucet handle 14. For example, P can represent the fully extended right position of the faucet handle 14 and –P can represent the fully extended left position of the faucet handle 14. In another embodiment, the positions may be switched so P can represent the fully extended left position of the faucet handle 14 and –P can represent the fully extended right position of the faucet handle 14. In the shown example, there are five divisions along the spectrum of temperature turn values 73. In another embodiment, there may be any number of divisions. In another embodiment, P may be divided into quarters and sixths. The temperature turn value 73 can be divided into a plurality of divisions.

The table is divided into several sections as shown in FIG. 7. Each section represents a location the faucet handle 14 can be located during operation. If the faucet handle 14 is located within one of the sections, then the faucet 10 would release water according to the values 74, 75 within the section. For example, if the faucet handle 14 has been extended between 75% to 100% of the percentage of water flow 72 and the faucet handle 14 has been turned to a value between 2P/3 and P for the temperature turn value 73, the faucet 10 would release 100 or the maximum amount of water from servo motor two 44 and no water from servo motor one 42.

In another embodiment, the table shown in FIG. 7 can be divided into a plurality of sections such that a continuous change of water flow from water supply inlet hoses 26 through the servo motors 42, 44 can be achieved as the faucet handle 14 changes location along the spectrum of percentage of water flow 72 and temperature turn value 73. In the shown example, the values have a fixed maximum depending on where the faucet handle 14 is located along the spectrum of percentage of water flow 72. The servo motor 42 or 44 side that the faucet handle 14 is located under has the maximum percentage of water flow 72 for the value for servo motor inlet 74 or 75 and the other value for servo motor inlet 74 or 75 is decremented down to zero on the far end depending on how many divisions there are for the temperature turn value 73. In the shown example, there are five divisions and within the first division on each side both of the values for the servo motor inlets 74, 75 are at the maximum depending on where along the spectrum the faucet handle 14 falls on the percentage of water flow 72. Within the next division, the value for the servo motor inlet 74 or 75 for the side the faucet handle 14 is located stays the maximum value and the other value for the servo motor inlet 74 or 75 drops to half of the maximum value. Within the last division, the value for the servo motor inlet 74 or 75 for the side the faucet handle 14 is located stays the maximum value and the other value for the servo motor inlet 74 or 75 drops to zero.

In another embodiment, the values for the servo motor inlets 74, 75 may be decremented in a different way. In another embodiment, the values 74, 75 may be decremented by thirds. The settings for the divisions may be changed depending on user preference. More divisions can result in a more continuous change in water temperature and water flow. The fewer divisions can result in energy conservation since the servo motors 42, 44 will not need to be changed in operation as frequently.

The controller 18 can receive the signals from the sensor PCBA 30 to detect the spatial orientation of the faucet handle 14. The controller 18 can use an algorithm to calculate where in the spectrum of percentage of water flow values 72 and temperature turn values 73 the faucet handle 14 is located from the signals received from the sensor PCBA 30. After crossing a threshold for either percentage of water flow values 72 or temperature turn values 73, the controller 18 can send signals to the flow control box 20 to operate the servo motors 42, 44 to release water of an updated temperature and water flow depending on the spatial orientation of the faucet handle 14.

In another embodiment, the controller 18 can use a look-up table to see what values the controller 18 should set for the values of the servo motor water inlets 74, 75. The controller determines the spatial orientation of the faucet handle 14 and determines which section the faucet handle 14 is located. If the faucet handle 14 is located in section number 16 71, then the controller 18 sends a signal to the flow control box 20 to close the water supply inlet hose 26 for servo motor one 42 and open the water supply inlet hose 26 for servo motor two 44 to the maximum in order to achieve the value for servo motor inlet 1 74 of 0 and the value for servo motor inlet 2 75 of 100.

Figure 8:
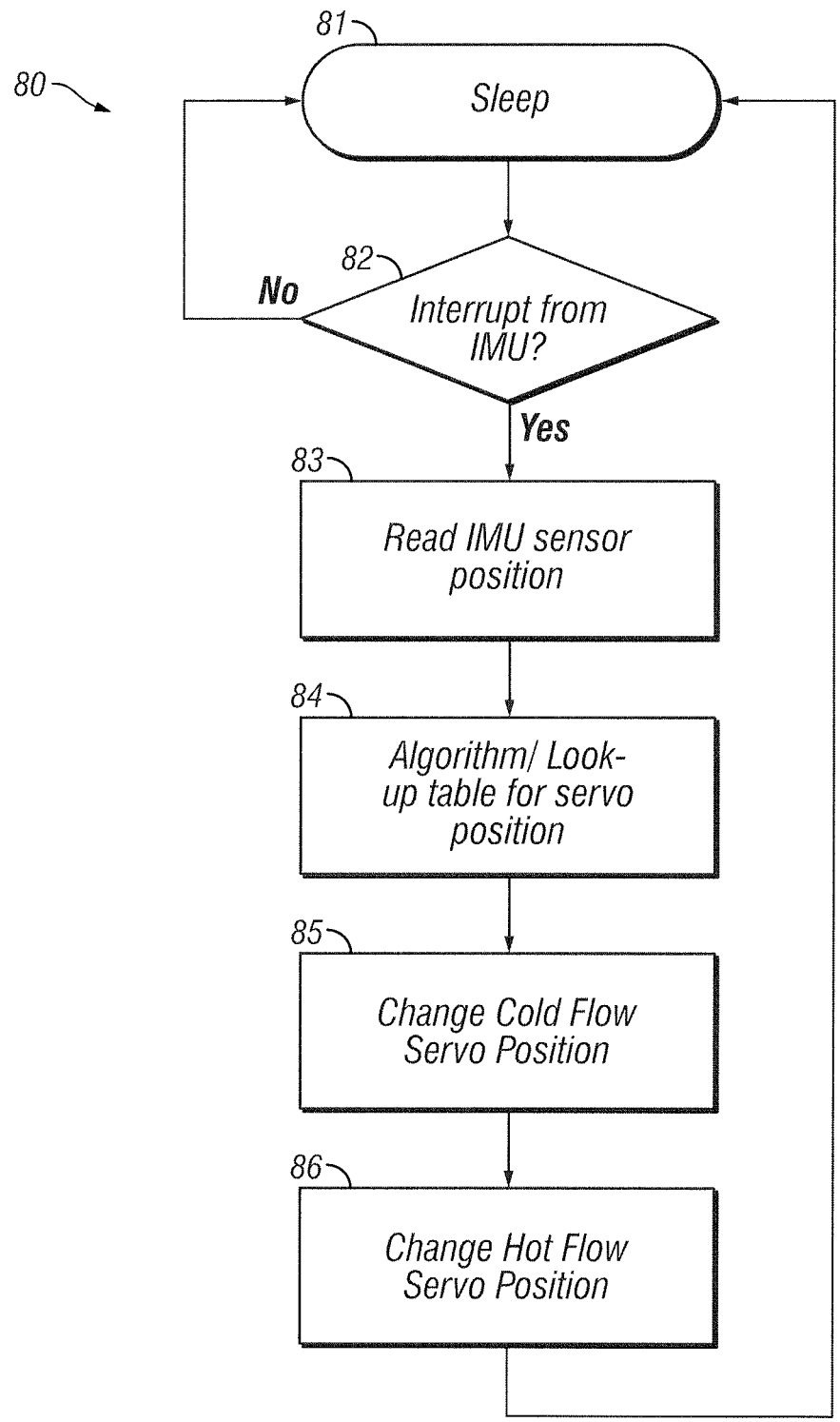
FIG. 8 is a simplified flowchart showing an example operation of the faucet according to an embodiment of the disclosure.

FIG. 8 is a simplified flow chart showing an example operation of the faucet 10. In the shown example, the faucet 10 uses an interrupt method 80 of controlling the operation of the flow control box 20. In the shown example, the interrupt method 80 begins with operation 81 in which the controller 18 is in a sleep state to conserve energy waiting to receive an interrupt from the sensor PCBA 30 or inertial motion unit (IMU) sensor 30. After operation 81, the process continues to operation 82 where there is a check for an interrupt from the IMU sensor 30. If there is an interrupt received from the IMU sensor 30, then the process continues to operation 83. If an interrupt is not received, then the process returns to operation 81 for the controller 18 to sleep.

After the process continues to operation 83, the controller 18 will read the IMU sensor 30 position to determine the spatial orientation of the faucet handle 14. After the controller 18 reads the IMU sensor 30, the process continues to operation 84 where the controller 18 will use an algorithm to calculate the servo motor 42, 44 positions or look-up table for the servo motor 42, 44 positions according to the determined spatial orientation of the faucet handle After the controller 18 determines the servo motor 42, 44 positions, the process continues to operation 85 where the controller 18 sends a signal to the flow control box 20 to change the servo motor 42 or 44 position to change the cold water value being released through pull down hose 24 to spray head 16. After the servo motor 42 or 44 position is changed, the process continues to operation 86 where the controller 18 sends a signal to the flow control box 20 to change the servo motor 42 or 44 position to change the hot water value being released through pull down hose 24 to spray head 16. After both servo motor 42, 44 positions are updated, the process returns to operation 81. In another embodiment, the hot water value may be changed first before the cold water value and so the corresponding servo motor 42 or 44 would change.

In another embodiment, the controller 18 may further wait for another interrupt after receiving an initial interrupt from the IMU sensor 30 to update the positions of the servo motors 42 or 44. The delay can be to wait for the final position the user intends to position the faucet handle 14. The delay may be a set predetermined period of time for the controller 18 to wait to receive additional interrupts. Therefore, the faucet 10 would only need to go through the process once instead of multiple times depending on how many sections the faucet handle 14 crosses.

Figure 9:
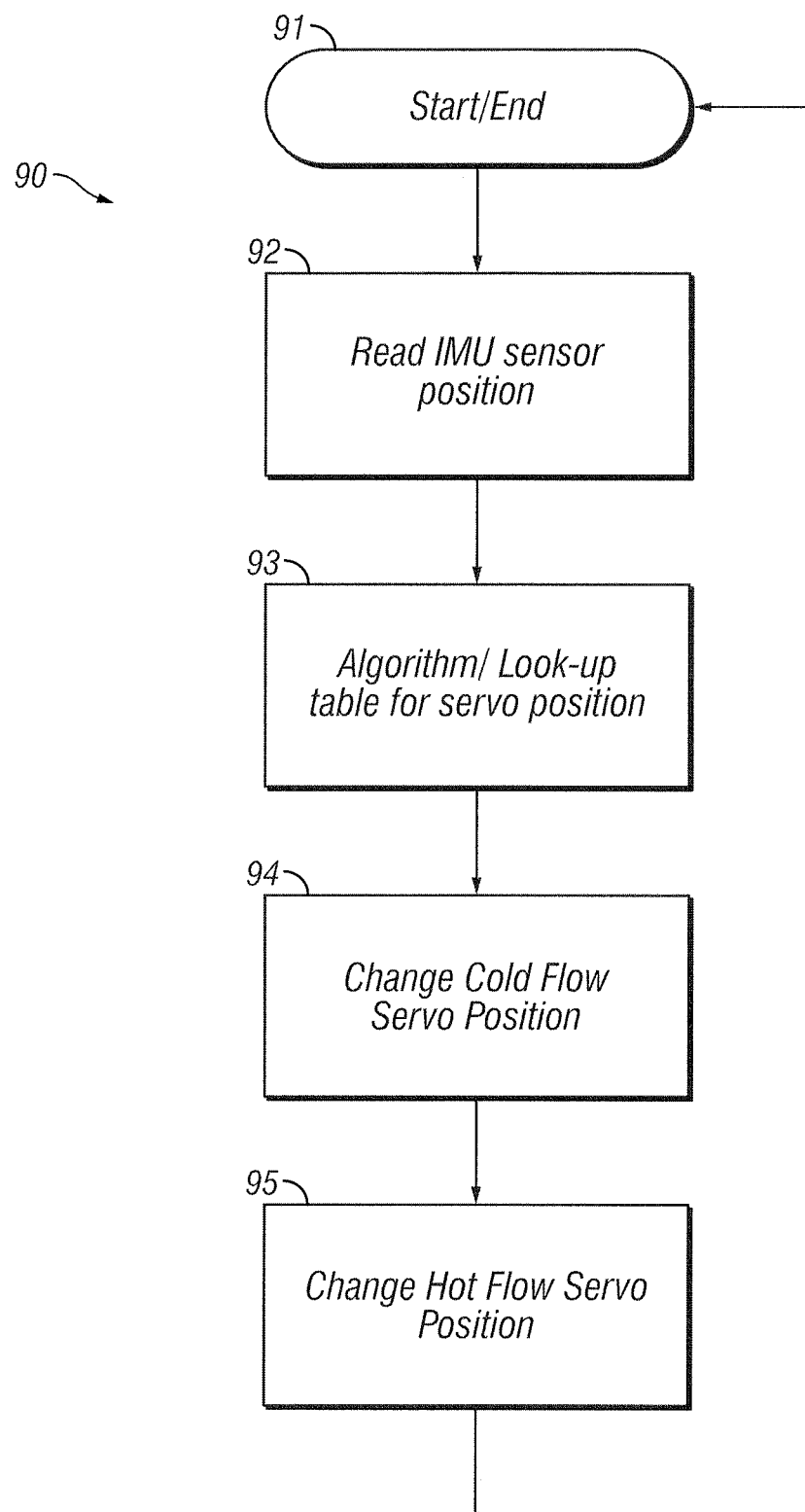
FIG. 9 is a simplified flowchart showing another example operation of the faucet according to an embodiment of the disclosure.

FIG. 9 is a simplified flow chart showing an example operation of the faucet 10. In the shown example, the faucet 10 uses a polling method 90 of controlling the operation of the flow control box 20. In the shown example, the polling method 90 begins with operation 91 in which the controller 18 starts and turns on. After the controller 18 is on, the process continues to operation 92 where the controller 18 reads the IMU sensor 30 position to determine the spatial orientation of the faucet handle 14. After the controller 18 reads the IMU sensor 30, the process continues to operation 93 where the controller 18 will use an algorithm to calculate the servo motor 42, 44 positions or look-up table for the servo motor 42, 44 positions according to the determined spatial orientation of the faucet handle 14. After the controller 18 determines the servo motor 42, 44 positions, the process continues to operation 94 where the controller 18 sends a signal to the flow control box 20 to change the servo motor 42 or 44 position to change the cold water value being released through pull down hose 24 to spray head 16. After the servo motor 42 or 44 position is changed, the process continues to operation 95 where the controller 18 sends a signal to the flow control box 20 to change the servo motor 42 or 44 position to change the hot water value being released through pull down hose 24 to spray head 16. After both servo motor 42, 44 positions are updated, the process returns to operation 91. In another embodiment, the hot water value may be changed first before the cold water value and so the corresponding servo motor 42 or 44 would change.

The polling method 90 can allow for a more continuous change in water flow and temperature than the interrupt method 80 because there is not a wait for an interrupt by the IMU sensor 30. However, the polling method 90 expends more energy by constantly updating the process. In one embodiment, the user can set the method of operation for the faucet 10. For example, there may be a switch (not shown) that can be used to change the method of operation for the faucet 10.

Figure 10C:
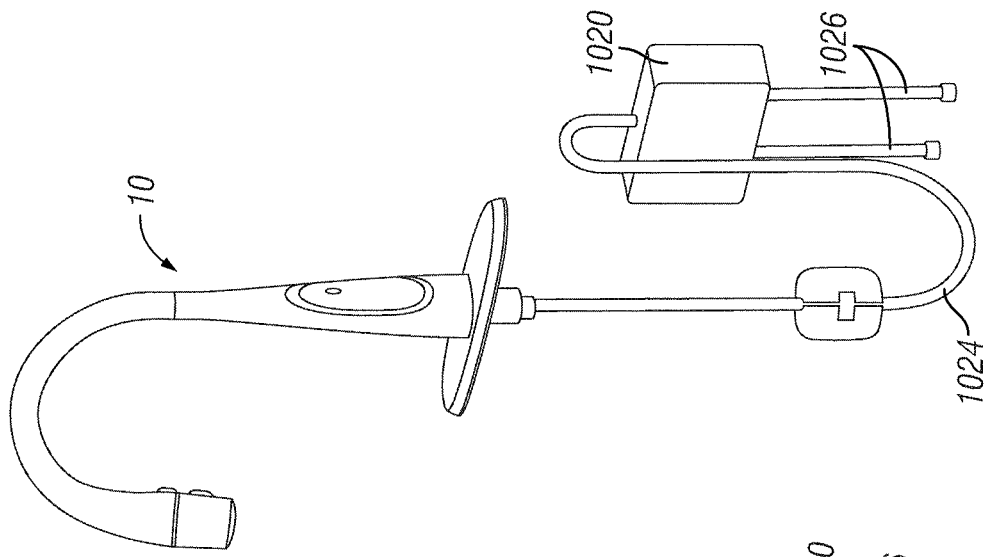
FIGS. 10A, 10B, and 10C illustrate a side-by-side comparison of three example kitchen faucets according to some embodiments of the disclosure.
Figure 10B:
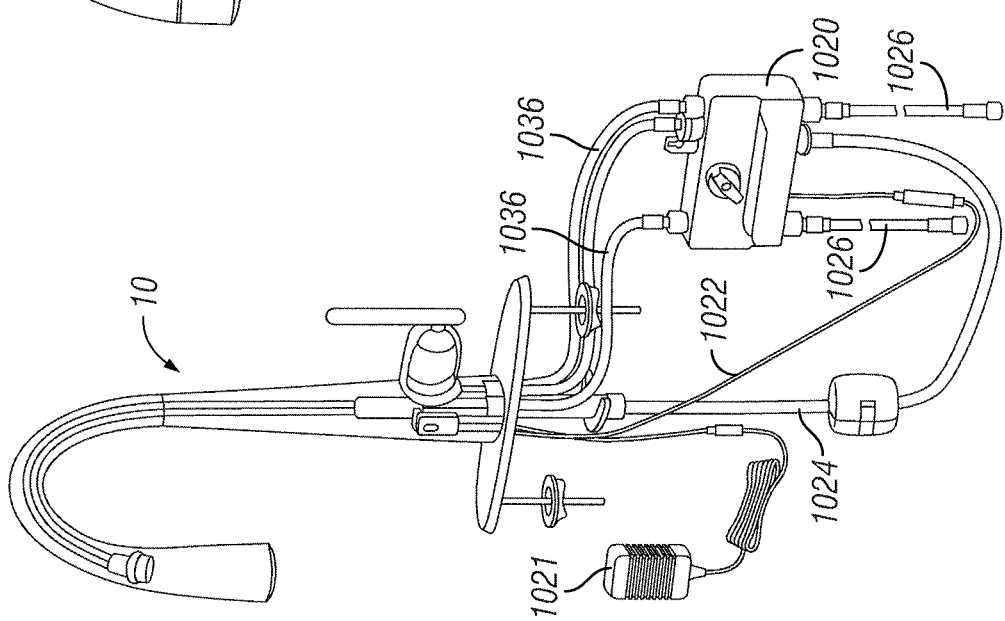
Figure 10A:
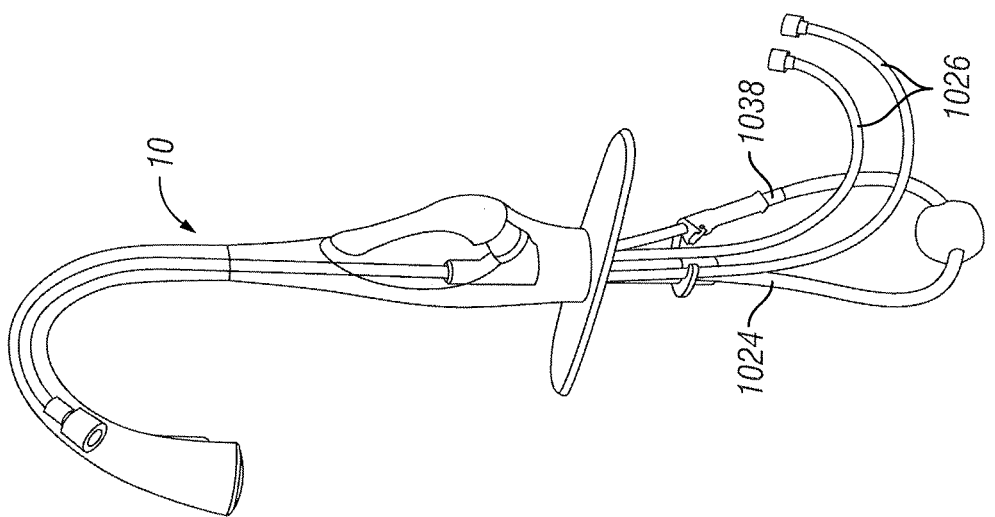

FIGS. 10A, 10B, and 10C illustrate a side-by-side comparison of three example kitchen faucets according to some embodiments of the disclosure. Referring to FIG. 10A, a traditional setup is shown. FIG. 10A shows a pull-down hose 1024 and water supply inlet hoses 1026. FIG. 10B shows a setup according to some embodiments of the disclosure. FIG. 10B includes a flow control box 1020, a power supply 1021, a signal wire 1022, a pull-down hose 1024, water supply inlet hoses 1026, and water outlet hoses 1036. FIG. 10C illustrates an electronically controlled setup and includes a flow control box 1020, a pull-down hose 1024, and water supply inlet hoses 1026. As can be seen from the side-by-side comparisons in FIGS. 10A, 10B, and 10C, the electronically controlled setup illustrated in FIG. 10C provides the technical advantage of simplifying installation in comparison to other faucets due to the reduction in the number of hoses that must be connected and the fact that only a single hose need be connected through the deck or countertop.

In some embodiments, like that shown in FIGS. 10B and 10C, the mixing and flow control of the water happen away from the faucet body 12. One advantage of keeping mixing and flow control of water away from the faucet body 12 is that the design constraints for the faucet body are freed up and fewer hoses may be used to simplify installation, repair, and removal. The system may include a command unit (e.g., where the signal that controls the water flow is generated) which could be voice control, a user interface, a handle configured like those shown in FIGS. 10A-C, a flow control box that houses the valve control system, a power supply, and hoses that supply the water to the faucet.

Figure 11B:
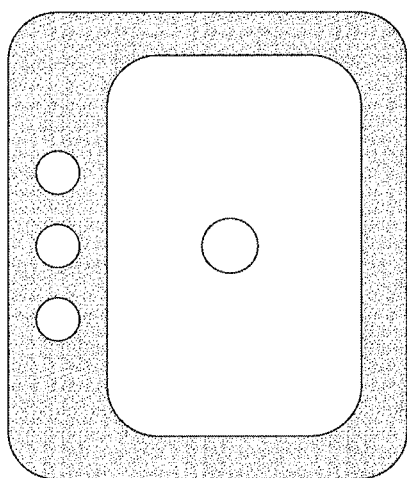
FIGS. 11A, 11B, 11C, and 11D illustrate example icons for use with the faucet according to an embodiment of the disclosure.
Figure 11D:
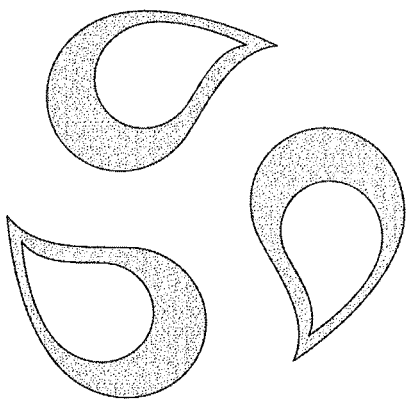
Figure 11A:
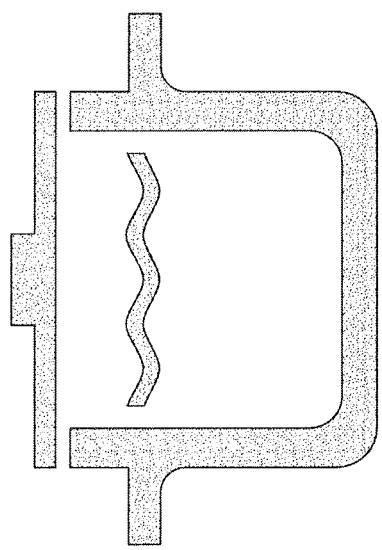
Figure 11C:
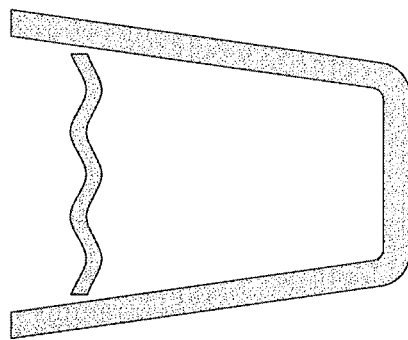

FIGS. 11A, 11B, 11C, and 11D illustrate example icons for use with the faucet according to an embodiment of the disclosure. FIG. 11A illustrates an example pot icon. In some embodiments, the interface 19 may display the pot icon of FIG. 11A when the faucet 10 receives a command to fill a pot. For example, the faucet 10 may receive a voice command, such as "Faucet, fill 6 quart pot," and the interface may illuminate to display the pot icon after receipt of the command and/or during operation of the faucet. FIG. 11B illustrates an example sink icon that may be displayed by interface 19 after receiving a command (e.g., "Faucet, fill sink") or during operation. FIG. 11C illustrates an example cup icon that may be displayed by interface 19 after receiving a command (e.g., "Faucet, fill cup" or "Faucet, fill 8 ounces") or during operation. FIG. 11D illustrates an example filter icon that may be displayed by interface 19 after receiving a command (e.g., "Faucet, 8 ounces of filtered water") or during operation.

Figure 12:
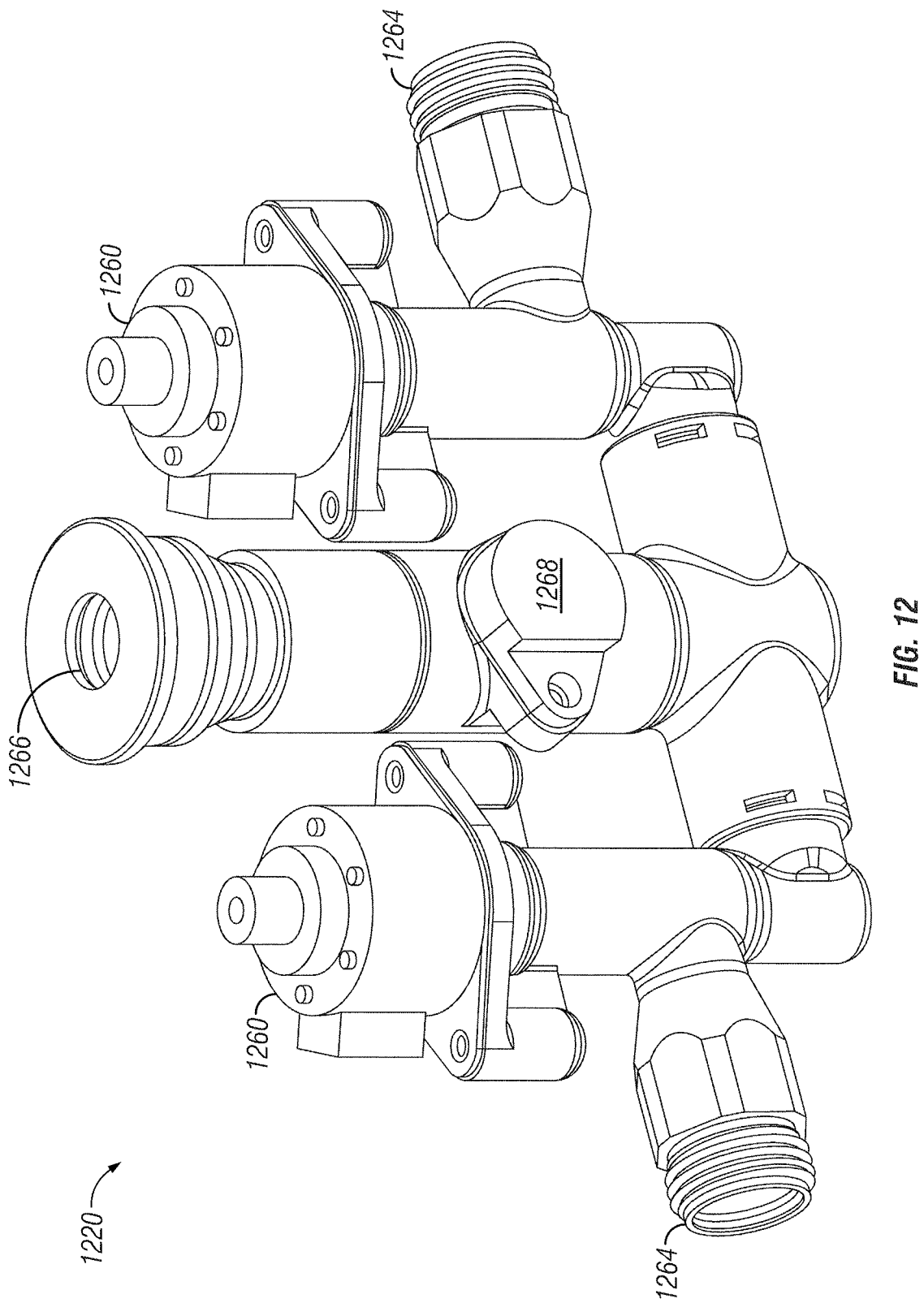
FIG. 12 is a perspective view of some components of a flow control box according to some embodiments.

FIG. 12 is a perspective view of some components of a needle valve flow control box according to some embodiments. FIG. 13 is a cross-section view of the flow control box of FIG. 12. FIGS. 12 and 13 show some components of a flow control box 1220, including linear stepper motors 1260, needle valves 1262, water supply inlet connections 1264, mixed water outlet connection 1266, and sensor(s) 1268. The flow control box 1220 may be connected to other components, such as control circuitry, networking circuitry, embedded systems, or other components. For example, the linear stepper motors 1260 and the sensor(s) 1268 may be connected to the controller 18, circuitry 17, and/or signal wire 22.

During operation according to some embodiments, hot and cold water supply inlet hoses are connected to the water supply inlet connections 1264. The needle valves 1262 are coupled to the linear stepper motors 1260 such that the linear stepper motors 1260 can move the needle valves to increase or decrease the flow of water to the faucet. Based on the desired water output (e.g., as received from a voice command, a spatial orientation command, a mechanical command), the controller may actuate one or both of the linear stepper motors 1260 which in turn moves the needle valve and in turn increases or decreases the amount of cold or hot water that is provided to the faucet via the mixed water outlet connection 1266.

One or more sensor(s) 1268 may be included with the faucet 10 and/or the flow control box 1220. For example, a flow rate sensor (e.g., a Hall-effect sensor) may be included to meter or determine the amount of water. This may be beneficial if a desired volume of water is needed.

For example, a voice-controlled faucet may be able to receive a command such as "Faucet, fill a cup of water" or "Faucet, fill 3 quarts of water" and use the flow rate sensor to dispense that specific volume of water or close to that specific volume of water. Other sensors 1268 may be used as well. For example, the flow control box 1220 may include a temperature sensor. This may be beneficial if a desired temperature of water is needed. For example, the faucet may receive a command such as "Faucet, dispense at 200 degrees" and use the temperature sensor to mix the proper amount of hot and cold water to dispense water at the requested temperature. Similarly, the faucet 10 and flow control box 1220 may work in tandem with other components (e.g., the controller 18, circuitry 17), or with custom or user-defined programming (e.g., IFTTT). For example, the faucet may receive a command such as "Faucet, fill a cup of filtered water for green tea," look-up the correct temperate for steeping green tea (e.g., 175 degrees Fahrenheit), and dispense eight ounces of water at 175 degrees Fahrenheit.

Figure 14A:
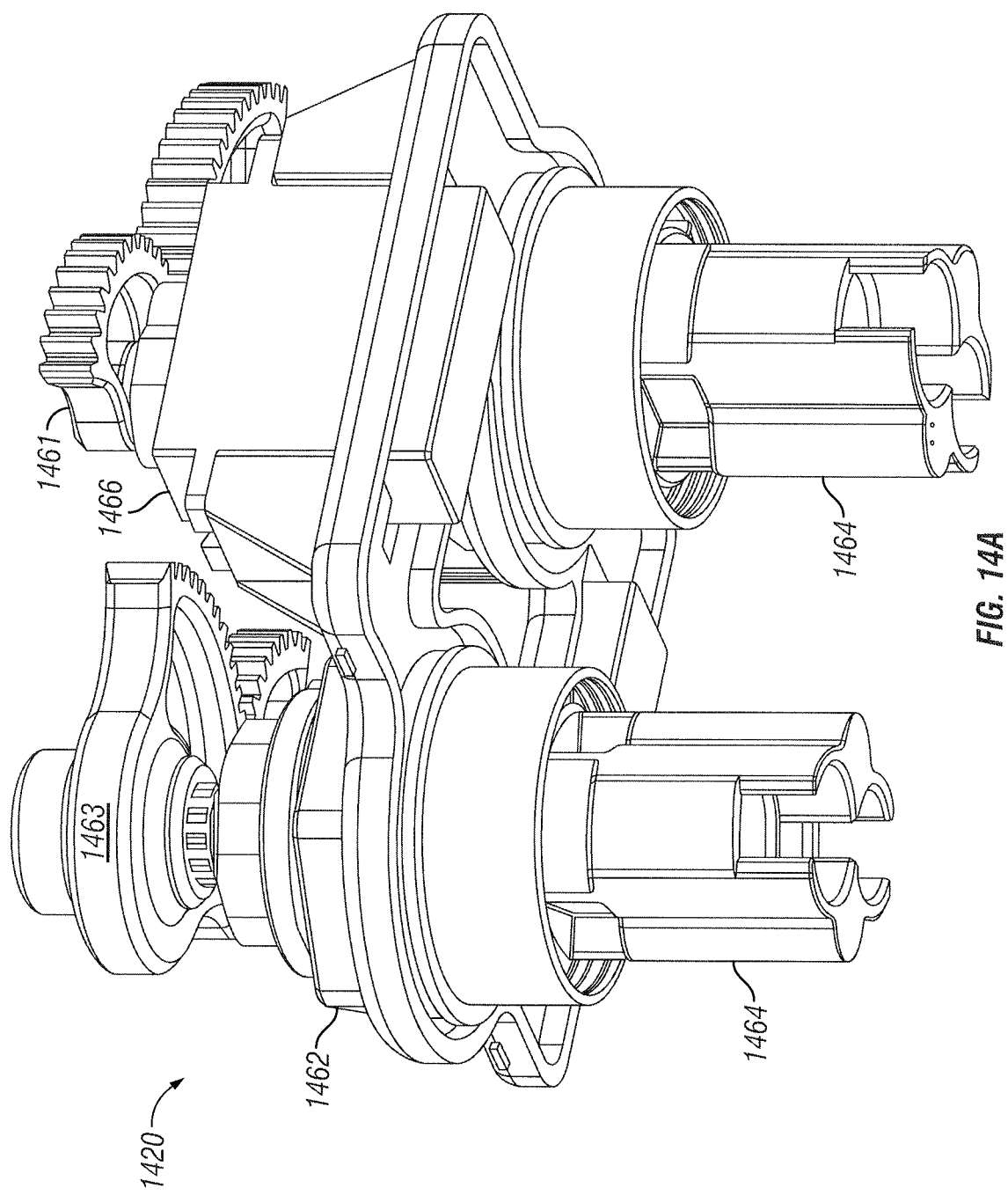
FIGS. 14A, 14B, and 14C illustrate some components of a flow control box 1420 with servo motor controls, according to an example embodiment.
Figure 14B:
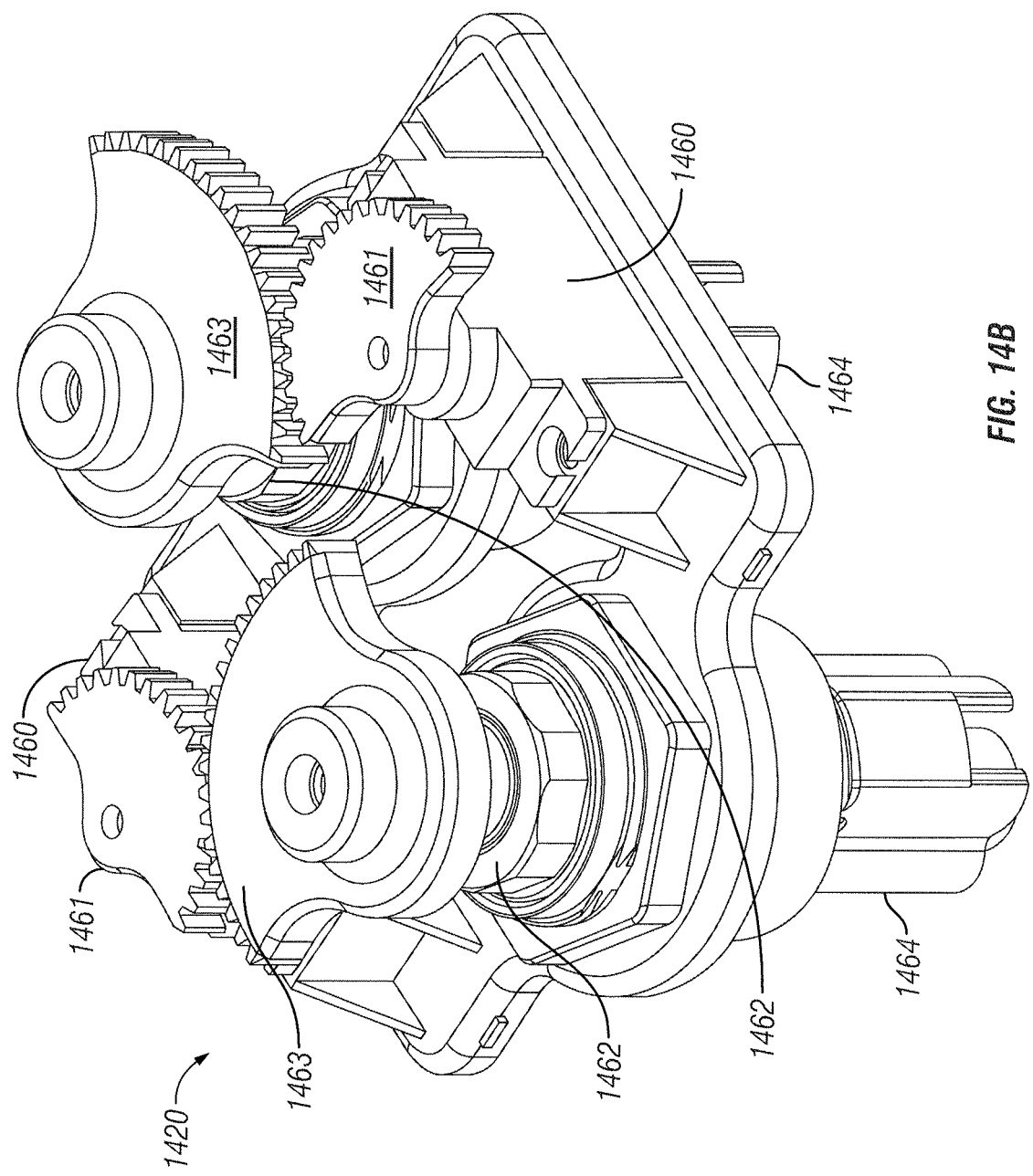
Figure 14C:
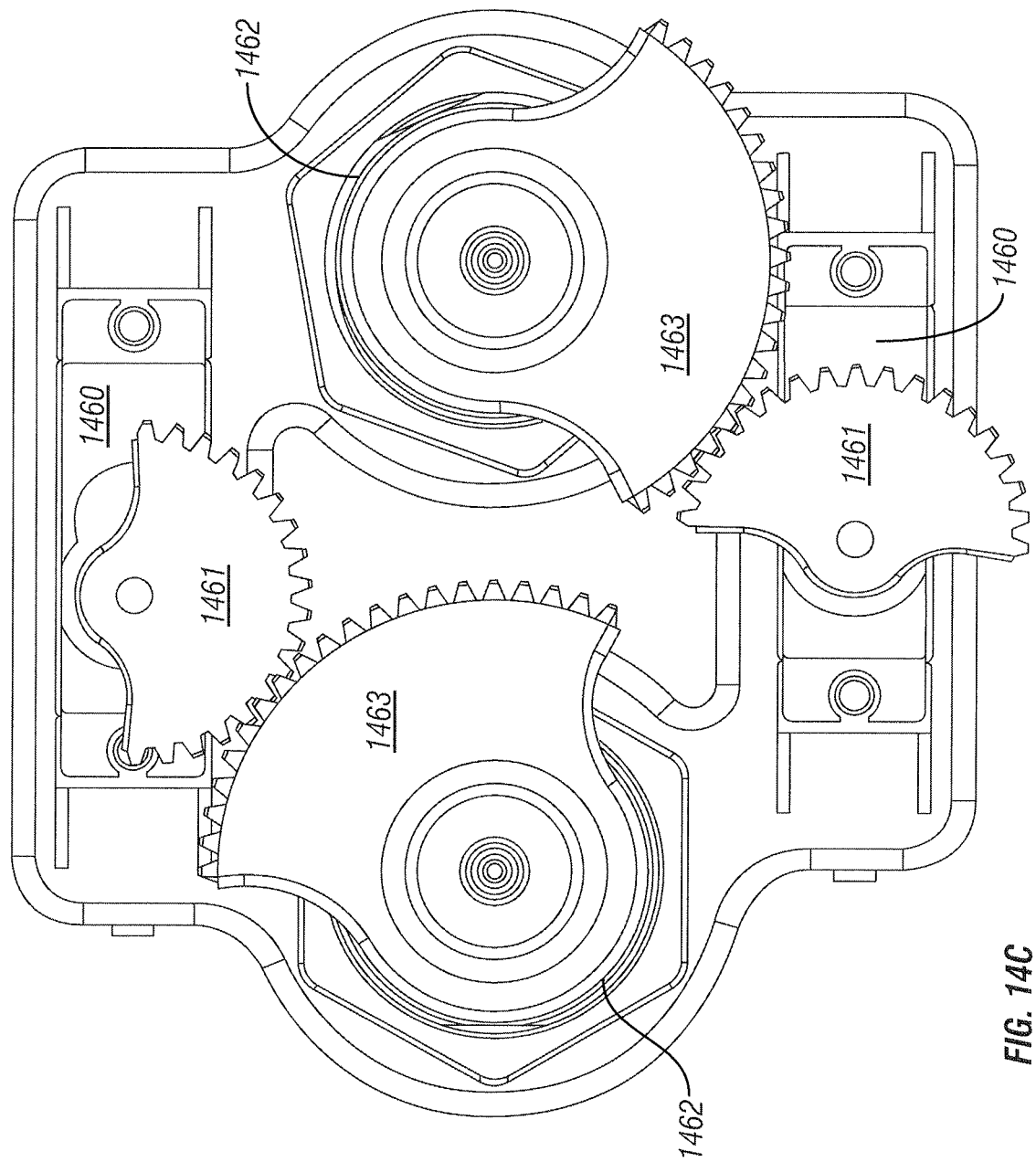

FIGS. 14A, 14B, and 14C illustrate some components of a flow control box 1420 with servo motor controls, according to an example embodiment. FIGS. 14A-C show some component of a flow control box 1420, including servo motors 1460, servo motor gears 1461, valves 1462, valve gears 1463, and water inlet supply connections 1464. The flow control box 1420 may be connected to other components, such as control circuitry, networking circuitry, embedded systems, sensors, or other components and as described elsewhere for other flow control boxes herein.

Still referring to FIGS. 14A-C, the two servo motors 1460 are coupled to the valves 1462 via the servo motor gears 1461 which are linked to respective valve gears 1463. In operation, the servo motors 1460 drive the position of the valves 1462. In some embodiments, the valves 1462 may be cartridge valves. For example, one valve could be connected to a cold water line and another valve could be connected to a hot water line. Thus, a first servo motor could be used to control flow of cold water and a second servo motor could be used to control flow of hot water. As long as no obstructions or mechanical failures occur, the servo motors 1260 will drive its servo motor gear 1461 (via its output shaft) to the position of the control pulse. Thus, the faucet 10 (e.g., via the controller 18, circuitry 17, or other circuitry) can safely assume the position of the valves 1462. As an added measure of monitoring and to help minimize errors, position feedback may be used such that the servo motors 1460 can monitor the position of its output shaft and thus its servo motor gear. An example of position feedback includes adding a feedback wire to a potentiometer or rotary encoder used with the servo motor drive.

Figure 15:
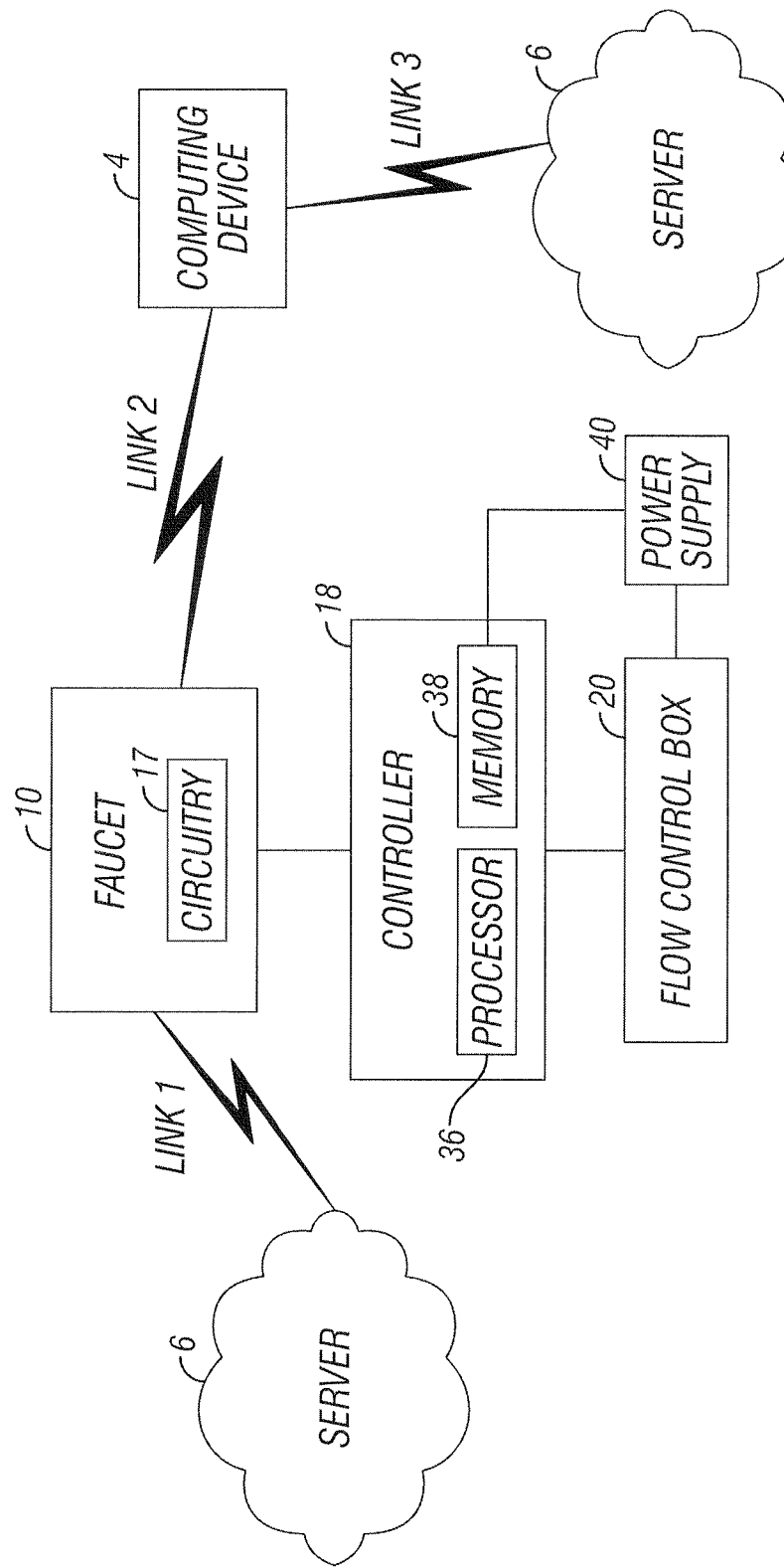
FIG. 15 illustrates an example electronic control system for controlling dispensing of water from a faucet 10.

Referring to FIG. 15, there is shown an example electronic control system for controlling dispensing of water from the faucet 10. In the example shown in FIG. 15, the control system includes the controller 18 including a processor 36 to process the signals received from the faucet circuitry 17 to send a signal to the flow control box 20 and a memory 38 to store instructions to be executed by the processor 36. The control system also includes a power supply 40 that is connected to the controller 18 and the flow control box 20. The faucet circuitry 17 may include networking components (e.g., Bluetooth, WiFi, mesh networking, Zigbee, etc.) such that the faucet 10 is communicatively coupled with other components. In some embodiments, the faucet 10 may use one or more communication links, such as Link 1 and Link 2 illustrated in FIG. 15.

In one embodiment, faucet 10 may have a microphone included in its circuitry 17 and be voice enabled. After receiving a voice command, faucet 10 may communicate with other computing devices via the Internet, a server, or another component (e.g., a networked computing device or a cloud network service) to determine what action to take based on the received voice command. In some embodiments, the faucet may have more than one microphone. For example, the microphone could be located adjacent to each other or at separate points on the faucet body. By way of example, the faucet may have one microphone on the front of the faucet body (sink facing) and another microphone on the back (backsplash facing). By way of another example, the faucet may have a microphone on the front of the faucet body (sink facing) and another microphone on the top of the spout tube (ceiling facing). Many variations of locations could be used depending on the circumstances.

The control system also includes the flow control box 20 (such as the needle valve or servo motor flow control boxes described herein) to control the water received from water supply inlet hoses 26 to output water.

In some embodiments, the faucet 10 may additionally or alternatively be communicatively coupled (e.g., via Links 2 and 3) to a computing device 4 which is in turn communicatively coupled to a server 6 or cloud network service. In one embodiment, the faucet 10 may be communicatively coupled to a computing device 4 such as a commercially available consumer device (e.g., the Amazon Echo™ or the Google Home™). The computing device 4 may, in turn, be communicatively coupled to a server 6 (e.g., Amazon Web Servers), the Internet, or other computing devices. As described further with reference to FIG. 16 and method 1600, the faucet 10 may use the functionality of the computing device 4 (e.g., voice-recognition capabilities, network capabilities, programmable functionality, etc.) to boost its own functionality.

In one embodiment, networking more than one faucet provides additional functionality and metrics. For example, a home may include more than one faucet with functionality described herein such that the household aggregate water consumption (and other metrics such as temperature, time, etc.) through faucets could be tracked. This data may benefit predictive metrics and save time and money. For example, a household might be able to better predict when and how much hot water is needed in order to only heat the amount of water needed at the correct time.

Figure 16:
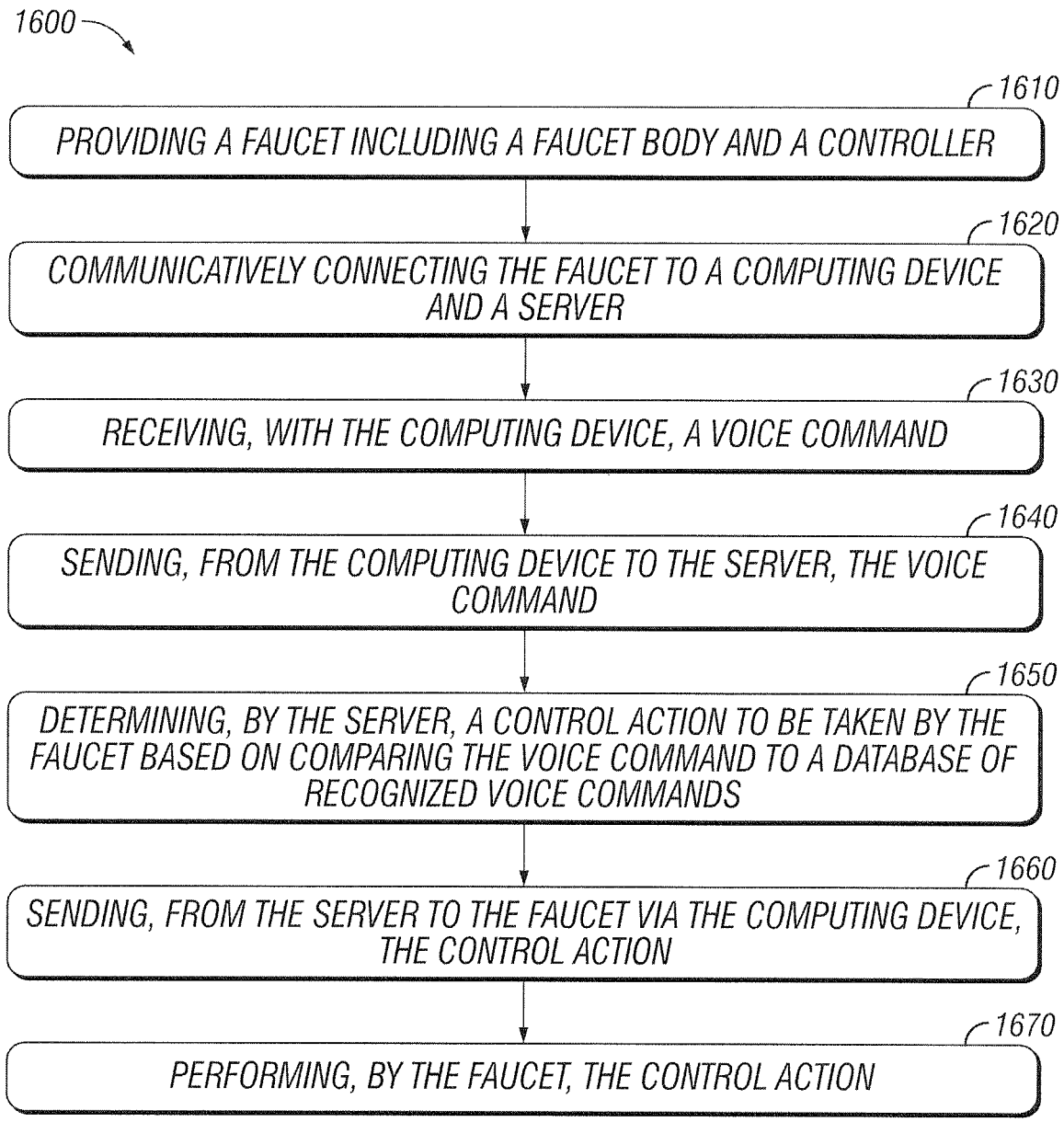
FIG. 16 is a simplified flow chart showing an example method 1600 of operation of the faucet 10.

FIG. 16 is a simplified flow chart showing an example method 1600 of operation of the faucet 10. In the shown example, the faucet 10 dispenses water in response to receiving a voice command. At 1610, a faucet includes a faucet body and a controller. At 1620, the faucet communicatively connects to a computing device and a server. At 1630 the computing device receives a voice command. At 1640, a computing device sends a voice command to the server. At 1650, the server determines a control action to be taken by the faucet based on a comparison of the voice command to a database of recognized voice commands. At 1660, the server sends to the faucet, via the computing device, the control action. At 1670, the faucet performs the control action.

Control actions described herein are not meant to be limiting and include, for example, adjusting the flow, temperature, rate, volume, and duration of water being dispensed by the faucet. In some cases, the faucet 10 may be controlled by speaking to it with set voice commands, which may be initiated by a predetermined and recognized voice trigger, such as "Faucet," "Computer," "Siri," "Alexa," or "OK Google." The faucet may perform the control actions, for example, by using a flow control box as described herein.

It is noted that the control action examples and voice triggers discussed above are intended as exemplary rather than limiting. For example, in association with faucet actuation control actions, one or more safety actions could also be included. For example, in some cases where a control action includes actuating or opening a faucet valve to dispense water, a further control action can be preset to occur, such as to turn off or close the faucet valve within a predetermined amount of time or based on sensing a condition (e.g., water rising above a predetermined level) detected by sensors surrounding the faucet. Still further, other safety checks can be included in control actions, e.g., to determine a proximity of the user before dispensing water, or to adjust water flow gradually over time, such that a water flow rate tapers off near an end of a dispensing control action.

Figure 17:
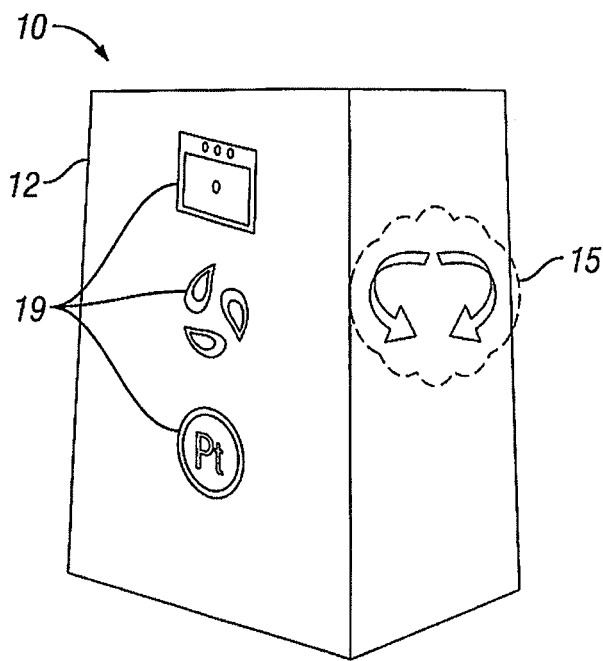
FIG. 17 is a perspective view of the example voice-controlled kitchen faucet of FIG. 1E according to an embodiment of the disclosure.

FIG. 17 is a perspective view of the example voice-controlled kitchen faucet of FIG. 1E according to an embodiment of the disclosure. In the example shown in FIG. 17, the faucet 10 includes a faucet body 12, a tactile interface 15, and an interface 19. In some embodiments like the example shown in FIG. 17, the faucet 10 does not include a faucet handle 14 because it is otherwise controlled (e.g., via voice or tactile commands). In some embodiments, the interface 19 and the tactile interface 15 are integrated within the faucet body 12.

Although tactile interface 15 is illustrated in FIG. 17 at one location on the faucet body 12, this is not intended to be limiting and one or more other portions of the faucet 10 may include one or more tactile interfaces 15. In some embodiments, the faucet body 12 may have a slightly thinner wall at the location of the tactile interface 15 that is able to flex when a user pushes on it. The deflection of the faucet body 12 wall may be measured by a sensor, such as the sensor 1800 illustrated in FIG. 18, for purposes of example only, as a ring-shaped force sensor. The sensor may detect a position as well as an amount of force exerted. These position and force data points may be used to electronically control the water flow characteristics as part of any of the embodiments of the electronically controlled faucet 10 disclosed herein.

A faucet 10 with a tactile interface 15 may be programmed to accept gesture and force controls. For example, a swipe in one direction might change water temperature or whether filtered water is dispensed, a clockwise circular gesture might increase water flow while a counterclockwise circular gesture might decrease water flow, a tap or hold might dispense a certain amount of water (while a more forceful tap or multiple taps may dispense a larger amount of water), or any other gestures may be associated with any other type of water control. The gestures may be user programmed (e.g., a user may be able to connect to a software application or directly to the faucet to customize the tactile interface).

In some embodiments, the sensor 1800 may help distinguish between multiple tactile controls. For example, a top portion of the sensor 1800 may be used to dispense filtered water (e.g., swipe right on the top half of the sensor to dispense cold filtered water and swipe left on the top half of the sensor to dispense hot filtered water) while a bottom portion of the sensor 1800 may be used to dispense unfiltered water (e.g., swipe right on the top half of the sensor to dispense cold unfiltered water and swipe left on the top half of the sensor to dispense hot unfiltered water).

In some embodiments, a faucet 10 with tactile interface 15 includes feedback, such as a visual feedback (e.g., via interface 19) or haptic feedback (e.g., sensor 1800 could vibrate after recognizing a command). Although tactile interface 15 is described with reference to the faucet illustrated in FIG. 1E, this is not intended to be limiting. Tactile interface 15 could be implemented with any faucet with electronic controls.

Figure 18:
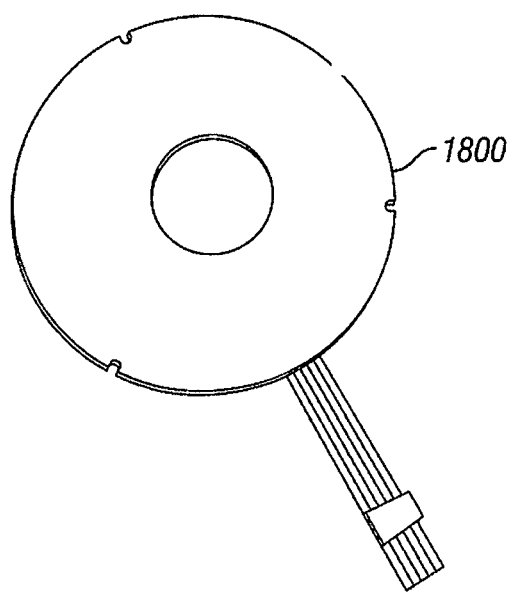
FIG. 18 is a top view of a sensor according to an embodiment of the disclosure.

FIG. 18 is a top view of a sensor 1800 according to some embodiments. Sensor 1800 may be one or more sensors and is not intended to be limited to the ring-shaped force sensor depicted in FIG. 18. Different sensors can be used for the tactile interface 15. For example, a force sensing linear potentiometer may be used that can detect position and force simultaneously in compact applications. Sensor 1800 could be an input touchpad, such as those used for electronic signature and character recognition. Sensor 1800 could also include accelerometers, gyroscopes, or other types of sensors. In some embodiments, sensor 1800 is a ring-shaped force sensor, that detects both position and force, and that is attached to the inside of faucet body 12.

Figure 19:
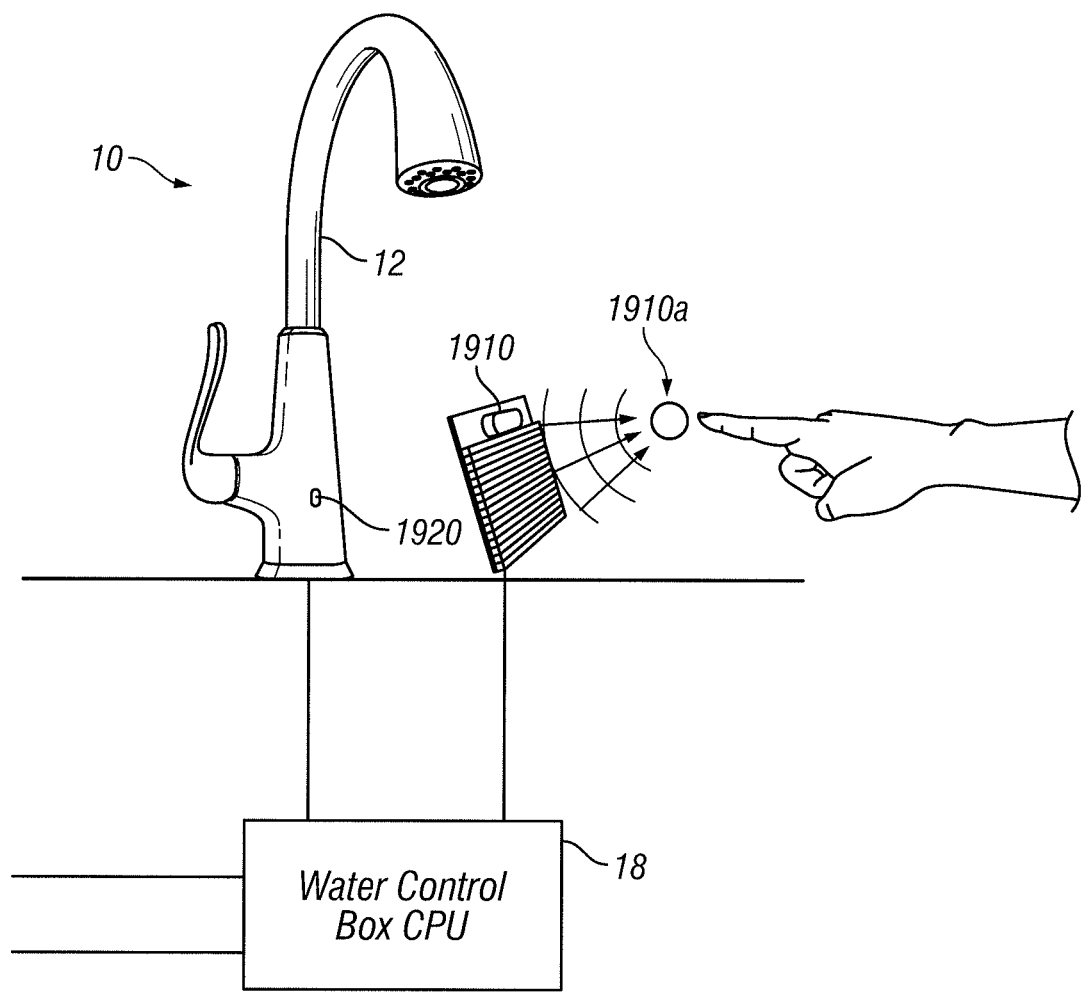
FIG. 19 is a perspective view of the example kitchen faucet with mid-air tactile feedback according to an embodiment of the disclosure.

FIG. 19 is a perspective view of the example faucet of FIG. 1E according to an embodiment of the disclosure that includes mid-air tactile feedback. In this embodiment, there is a mid-air tactile interface which allows the user to control the faucet, such as adjusting at least one of the temperature and flow rate, by manipulating a virtual object in mid-air without actually touching the faucet. Although the virtual object is invisible, the user will feel a tactile feedback as the user interacts with the mid-air tactile interface. In some cases, the virtual object could imitate a three-dimensional shape, which gives the user the sensation of manipulating a three-dimensional object, such as a knob, button, lever or slider, based on tactile feedback in mid-air. By having the user interact with a mid-air interface, this reduces or mitigates water stains, soap buildup, and fingerprints on the faucet, while providing a unique user experience.

In the example shown in FIG. 19, the faucet 10 includes a faucet body 12, a controller 18, an acoustical array 1910, a mid-air tactile interface 1910a, and a motion controller 1920. As discussed below, the acoustical array 1910 generates the mid-air tactile interface 1910a and the motion detector 1920 detects the user's interactions with the mid-air tactile interface 1910a. The controller 18 is configured to control the faucet, such as water flow and/or temperature, based on the user interactions with the mid-air tactile interface 1910a detected by the motion detector 1920.

The acoustical array 1910 creates a mid-air tactile interface 1910a where tactile sensations and feedback are present for a user, without the user having to touch the faucet. In some embodiments, the acoustical array 1910 includes a plurality of ultrasonic transducers, such as the transducer arrays manufactured by Ultrahaptics of Bristol, England. For example, the acoustical array 1910 could generate the mid-air tactile interface 1910a using an ultrasonic field to create a mid-air virtual object, which could be a knobs, button, lever, slider, etc., and can be used to control faucet temperature, flow rates, and/or other actions. The acoustical array 1910 may contain ultrasonic transducers that pulsate at various frequencies (e.g., 40 kHz) in different phases to generate low pressure and high pressure points, thus creating mid-air tactile interfaces 1910a with sensation and feedback.

In some embodiments, the faucet 10 might not include a faucet handle 14 because it is otherwise controlled (e.g., via voice or mid-air tactile commands). Although the acoustical array 1910 is shown in this example to be separate from the faucet body, in some embodiments the acoustic array 1910 could be integrated within the faucet body 12. Although the faucet is described herein as being voice controlled, in some embodiments voice control for the faucet is optional, and instead, the faucet could be controlled using the mid-air tactile interface 1910a.

Although mid-air tactile interface 1910a is illustrated in FIG. 19 at one location, this is not intended to be limiting. In some embodiments, the mid-air tactile interface 1910a and the acoustical array 1910 may be placed in different locations and/or multiple arrays and mid-air tactile interfaces may be used.

In some embodiments, control of the mid-air tactile interface 1910a is by a controller 18 with a motion detector 1920, such as a virtual reality controller like those manufactured by Leap Motion, Inc. of San Francisco, California. In the embodiment shown, the motion detector 1920 is integral with the faucet body 12. As shown, the faucet body 12 defines an opening through which the motion detector 1920 detects user movement. The controller 18 may recognize hand position and orientation in relation to virtual object(s) and allow for mid-air hand movement to adjust faucet controls (e.g., water temperature and flow rates). Although the motion detector 1920 is shown for purposes of example in the faucet body, this is not intended to be limiting. The motion detector 1920 could be located in different locations depending on the circumstances. The controller 18 may contain a processor to handle the acoustical array 1910, the water valves for mixing and water delivery, and the sensor 1920.

EXAMPLES

Illustrative examples of the faucet disclosed herein are provided below. An embodiment of the faucet may include any one or more, and any combination of, the examples described below.

Example 1. In combination with, or independent thereof, any example disclosed herein, a faucet including a faucet body and a faucet handle. An inertial motion unit sensor is mounted inside the faucet handle to sense spatial orientation of the faucet handle. The faucet includes an electronic flow control system to adjust flow volume and temperature of water being dispensed. The faucet includes a controller configured to receive signals from the inertial motion unit sensor and control the electronic flow control system to adjust flow volume and temperature of water being dispensed based upon the position of the faucet handle.

In Example 2. In combination with, or independent thereof, any example disclosed herein, further configured such that the inertial motion unit sensor includes at least one of a gyroscope, a magnetometer, or an accelerometer.

In Example 3. In combination with, or independent thereof, any example disclosed herein, further configured such that a range of movement along a first axis of the faucet handle adjusts the flow volume of water being dispensed.

In Example 4. In combination with, or independent thereof, any example disclosed herein, is further configured such that a range of movement along a second axis of the faucet handle adjusts the temperature of the water being dispensed, where the first axis and the second axis are not coplanar.

In Example 5. In combination with, or independent thereof, any example disclosed herein, further configured such that the electronic flow control system includes an electronic valve configured to control the flow volume of water being dispensed, and the controller is configured to control flow through the electronic valve based on a signal from the inertial motion unit sensor.

In Example 6. In combination with, or independent thereof, any example disclosed herein, further configured such that the controller is programmed with an algorithm configured to interpret a sensor output of the inertial motion unit sensor to adjust the flow volume and temperature of water being dispensed.

In Example 7. In combination with, or independent thereof, any example disclosed herein, further configured such that the controller is configured to use a look-up table to interpret a sensor output of the inertial motion unit sensor to adjust the flow volume and temperature of water being dispensed.

In Example 8. In combination with, or independent thereof, any example disclosed herein, is further configured with a flow control box is configured to be connected to at least two of a plurality of water supply inlet hoses and at least one outlet hose in fluid communication with the faucet body. The flow control box includes the electronic flow control system.

In Example 9. In combination with, or independent thereof, any example disclosed herein, further configured such that the controller is configured to substantially continuously check for an interrupt from the inertial motion unit sensor to read the inertial motion unit sensor in order to control the electronic flow control system to adjust the flow volume and temperature of water.

In Example 10. In combination with, or independent thereof, any example disclosed herein, further configured such that the controller is configured to substantially continuously read the inertial motion unit sensor in order to control the electronic flow control system to adjust the flow volume and temperature of water.

In Example 11. In combination with, or independent thereof, any example disclosed herein, further configured with a user–selectable portion in electrical communication with the controller from which reading the inertial motion unit sensor can be selected between: (1) substantially continuously checking for an interrupt from the inertial motion unit sensor to read the inertial motion unit sensor; and (2) substantially continuously reading the inertial motion unit sensor.

In Example 12. In combination with, or independent thereof, any example disclosed herein, further configured with a user–selectable portion in electrical communication with the controller from which interpretation of sensor output of the inertial motion unit sensor can be adjusted: (1) by adjusting an algorithm configured to interpret a sensor output of the inertial motion unit sensor to adjust the flow volume and temperature of water being dispensed; and/or (2) adjusting at least a portion of a look-up table to interpret a sensor output of the inertial motion unit sensor to adjust the flow volume and temperature of water being dispensed.

Example 13. In combination with, or independent thereof, any example disclosed herein, a method of controlling a flow volume and a temperature of water dispensed from a faucet. The method includes providing a faucet including a faucet body and a faucet handle. An inertial motion unit sensor measures a spatial orientation of the faucet handle. A controller receives a measurement of the spatial orientation of the faucet handle from the inertial motion unit sensor. The controller provides a signal to an electronic flow control system to adjust the flow volume and temperature of water being dispensed. The electronic flow control system adjusts the flow volume and temperature of water dispensed based upon the measurement of the spatial orientation of the faucet handle.

In Example 14. In combination with, or independent thereof, any example disclosed herein, further configured such that the inertial motion unit sensor includes at least one of a gyroscope, a magnetometer, or an accelerometer.

In Example 15. In combination with, or independent thereof, any example disclosed herein, further configured by adjusting the flow volume of water dispensed based upon a range of motion along one axis of the faucet handle.

In Example 16. In combination with, or independent thereof, any example disclosed herein, further configured by adjusting the temperature of water dispensed based upon a range of motion along one axis of the faucet handle.

In Example 17. In combination with, or independent thereof, any example disclosed herein, is further configured such that the electronic flow control system includes at least two of a plurality of servo motors to control the flow volume of water being dispensed.

In Example 18. In combination with, or independent thereof, any example disclosed herein, is further configured by interpreting the measurement of the spatial orientation of the faucet handle with the controller by using an algorithm to adjust the flow volume and temperature of water being dispensed.

In Example 19. In combination with, or independent thereof, any example disclosed herein, is further configured by interpreting the measurement of the spatial orientation of the faucet handle with the controller by using a look-up table to adjust the flow volume and temperature of water being dispensed.

In Example 20. In combination with, or independent thereof, any example disclosed herein, is further configured by connecting at least two of a plurality of water supply inlet hoses and at least one of an outlet hose in fluid communication with the faucet body. The flow control box includes the electronic flow control system.

In Example 21. In combination with, or independent thereof, any example disclosed herein, is further configured by checking continuously for an interrupt from the inertial motion unit sensor with the controller to read the inertial motion unit sensor in order to control the electronic flow control system to adjust the flow volume and temperature of water.

In Example 22. In combination with, or independent thereof, any example disclosed herein, is further configured by reading continuously the inertial motion unit sensor with the controller in order to control the electronic flow control system to adjust the flow volume and temperature of water.

In Example 23. In combination with, or independent thereof, any example disclosed herein, further configured such that the controller wirelessly receives the measurement of the spatial orientation of the faucet handle from the inertial motion unit sensor.

In Example 24. In combination with, or independent thereof, any example disclosed herein, is further configured such that the controller wirelessly provides the signal to the electronic flow control system to adjust the flow volume and/or temperature of water being dispensed.

Example 25. In combination with, or independent thereof, any example disclosed herein, a method of controlling water dispensed from a faucet in response to receiving a voice command. The method includes providing a faucet including a faucet body and a controller. The method includes communicatively connecting the faucet to a computing device and a server. The method includes receiving, with the computing device, a voice command. The method includes sending, from the computing device to the server, the voice command. The method includes determining, by the server, a control action to be taken by the faucet based on comparing the voice command to a database of recognized voice commands. The method includes sending, from the server to the faucet via the computing device, the control action. The method includes performing, by the faucet, the control action.

In Example 26. In combination with, or independent thereof, any example disclosed herein, further configured such that the voice command is initiated with a predetermined voice trigger.

Example 27. In combination with, or independent thereof, any example disclosed herein, a faucet with a faucet body is disclosed. The faucet includes an electronic flow control system to adjust flow volume of water being dispensed. The faucet includes a controller configured to receive signals from a computing device and control the electronic flow control system to adjust the flow volume of water being dispensed. The computing device further includes a microphone and voice recognition functionality. The controller controls the electronic flow control system to adjust the flow volume of water being dispensed based upon a voice command received by the computing device.

Example 28. In combination with, or independent thereof, any example disclosed herein, a faucet with a faucet body with a waterway for dispensing water is disclosed. An electronic valve is provided that is configured to adjust a temperature and/or a flow rate of water being dispensed through the waterway. The faucet includes means for controlling the electronic valve to adjust the temperature and/or the flow rate of water dispensed through the waterway responsive to detection of user movements in a mid-air space.

Example 29. In combination with, or independent thereof, any example disclosed herein, further configured such that the means for controlling the electronic valve is configured to generate a virtual object with tactile feedback in the mid-air space, and wherein the means for controlling the electronic valve adjusts the temperature and/or the flow rate responsive to user-interaction with the virtual object.

Example 30. In combination with, or independent thereof, any example disclosed herein, further configured such that the means for controlling the electronic valve is configured to generate the virtual object using an ultrasonic field.

Example 31. In combination with, or independent thereof, any example disclosed herein, further configured such that the means for controlling the electronic valve includes an array of ultrasonic transducers.

Example 32. In combination with, or independent thereof, any example disclosed herein, further configured such that the virtual object is a three-dimensional object.

Example 33. In combination with, or independent thereof, any example disclosed herein, further configured such that the virtual object includes the shape of a knob, button, lever and/or slider.

Example 34. In combination with, or independent thereof, any example disclosed herein, further configured such that the means for controlling the electronic valve includes a motion detector, and wherein the faucet body defines an opening through which the motion detector detects user movement interacting with the virtual object.

Example 35. In combination with, or independent thereof, any example disclosed herein, a faucet including a faucet body with a waterway for dispensing water is disclosed. The faucet includes an electronic valve for controlling a flow rate and/or a temperature of water in the waterway. An array of ultrasonic transducers is provided that are configured to generate an ultrasonic field that defines a mid-air virtual object that can be felt and manipulated by a user. A motion detector is provided that is configured to detect user movement manipulating the virtual object. The faucet includes a controller configured to control the electronic valve based on the motion detector sensing user movement manipulating the virtual object.

Example 36. In combination with, or independent thereof, any example disclosed herein, further configured such that the virtual object comprises a three-dimensional object.

Example 37. In combination with, or independent thereof, any example disclosed herein, is further configured such that the three-dimensional object is a knob, button, lever and/or slider. 34

Example 38. In combination with, or independent thereof, any example disclosed herein, further configured such that the array of ultrasonic transducers is configured to change the ultrasonic field responsive to user manipulation of the virtual object.

Example 39. In combination with, or independent thereof, any example disclosed herein, further configured such that the array of ultrasonic transducers is configured to change the ultrasonic field to adjust a linear positioning of the virtual object responsive to linear movement of the virtual object through user-manipulation.

Example 40. In combination with, or independent thereof, any example disclosed herein, further configured such that the array of ultrasonic transducers is configured to change the ultrasonic field to adjust a rotational positioning of the virtual object responsive to rotational movement of the virtual object through user-manipulation.

Example 41. In combination with, or independent thereof, any example disclosed herein, further configured such that the controller is configured to control the electronic valve to adjust one of the flow rate or temperature based on an adjustment in the linear positioning of the virtual object.

Example 42. In combination with, or independent thereof, any example disclosed herein, further configured such that the controller is configured to control the electronic valve to adjust the other of the flow rate or temperature based on an adjustment in the rotational positioning of the virtual object.

Example 43. In combination with, or independent thereof, any example disclosed herein, a method of controlling a faucet is disclosed. The method includes the step of providing an electronic faucet with a waterway for dispensing water and including an electronic valve configured to adjust a temperature and/or a flow rate of water being dispensed. An ultrasonic field is generated by an array of ultrasonic transducers that define a virtual object in mid-air that can be felt and manipulated by a user. The user movement manipulating the virtual object is detected by a motion detector. The method includes the step of controlling, by an electronic controller, the electronic valve to adjust the temperature and/or the flow rate of water being dispensed responsive to user movement manipulating the virtual object.

Example 44. In combination with, or independent thereof, any example disclosed herein, is further configured such that the virtual object comprises a three-dimensional object.

Example 45. In combination with, or independent thereof, any example disclosed herein, further configured such that the three-dimensional object is a knob, button, lever and/or slider.

Example 46. In combination with, or independent thereof, any example disclosed herein, is further configured such that the array of ultrasonic transducers is configured to adjust the ultrasonic field to positionally adjust the virtual object as the virtual object is user-manipulated.

Example 47. In combination with, or independent thereof, any example disclosed herein, further configured such that the ultrasonic field is configured to provide tactile feedback to user-manipulation of the virtual object.

Example 48. In combination with, or independent thereof, any example disclosed herein, a faucet is disclosed. The faucet includes a faucet body including a waterway for dispensing water and a tactile interface to sense at least one of a position and a force. The faucet includes an electronic flow control system to adjust flow volume and temperature of water being dispensed. The faucet includes a controller that is configured to receive signals from the tactile interface and control the electronic flow control system to adjust the flow volume and temperature of water being dispensed based upon the position or the force sensed by the tactile interface.

Example 49. In combination with, or independent thereof, any example disclosed herein, the tactile interface is integrated with the faucet body.

Example 50. In combination with, or independent thereof, any example disclosed herein, the faucet further includes a handle.

Example 48. In combination with, or independent thereof, any example disclosed herein, the tactile interface includes a ring sensor to detect at least one of the position and the force at the tactile interface.

Example 50. In combination with, or independent thereof, any example disclosed herein, the tactile interface includes at least one of visual and haptic feedback.

Example 51. In combination with, or independent thereof, any example disclosed herein, further including means for controlling the electronic flow control system to adjust at least one of the temperature and the flow rate of water dispensed through the waterway responsive to detection of user movements in a mid-air space. The means for controlling the electronic flow control system is configured to generate a virtual object with tactile feedback in the mid-air space. The means for controlling the electronic flow control system adjusts at least one of the temperature and the flow rate responsive to user-interaction with the virtual object.

Example 52. In combination with, or independent thereof, any example disclosed herein, the means for controlling the electronic flow control system is configured to generate the virtual object using an ultrasonic field.

Example 53. In combination with, or independent thereof, any example disclosed herein, the means for controlling the electronic flow control system includes a motion. The faucet body defines an opening through which the motion detector detects user movement interacting with the virtual object.

Example 54 is a method of controlling water dispensed from a faucet in response to receiving a voice command. The method includes receiving, with a computing device, a voice command associated with a faucet communicatively connected to the computing device, the faucet including a faucet body and a controller. The method also includes sending, from the computing device to the server, the voice command, and receiving a control action to be taken by the faucet from the server in response to the voice command. The method includes transmitting the control action to the faucet, thereby causing the faucet to perform the control action.

In Example 55. In combination with, or independent thereof, any example disclosed herein, the control action is determined at the server based on comparing the voice command to a database of recognized voice commands.

In Example 56, a method of controlling water dispensed from a faucet in response to receiving a voice command includes receiving a voice command associated with a faucet, the faucet including a faucet body and a controller, and sending the voice command to a server. The method includes receiving a control action to be taken by the faucet from the server in response to the voice command, and performing, by the faucet, the control action.

In Example 57. In combination with, or independent thereof, any example disclosed herein, the faucet includes an integrated microphone.

In Example 58, In combination with, or independent thereof, any example disclosed herein, receiving the voice command associated with the faucet is performed at a computing device communicatively connected to the faucet and the server.

In Example 59, provides a method of controlling water dispensed from a faucet in response to receiving a voice command. The method includes providing a faucet including a faucet body and a controller. The method includes communicatively connecting the faucet to a computing device and a server. The method includes receiving, with the computing device, a voice command. The method includes sending, from the computing device to the server, the voice command. The method includes determining, by the server, a control action to be taken by the faucet based on comparing the voice command to a database of recognized voice commands. The method includes sending, from the server to the faucet via the computing device, the control action. The method includes performing, by the faucet, the control action.

In Example 60. In combination with, or independent thereof, any example disclosed herein, further configured such that the voice command is initiated with a predetermined voice trigger.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A faucet assembly comprising:
a faucet comprising a faucet body;
a flow control box, the flow control box being separate from the faucet body, wherein the flow control box includes:
an electronic flow control system to adjust flow volume of water being dispensed, wherein the electronic flow control system includes a first valve and a second valve, wherein the operation of each of the first and second valves is controlled by a motor of the electronic flow control system; and
a controller configured to receive a control action from a server configured to issue control actions to the faucet assembly via a network connection between the faucet assembly and the server, the control action being based on a voice command received at the server from a computing device separate from the flow control box, and receive signals from a hands-free sensor configured to sense a user gesture,
wherein the controller is further configured to control the electronic flow control system to adjust flow volume of water being dispensed based on at least one of the control action or the user gesture; and
a user interface including one or more display indicators and the hands-free sensor,
wherein the one or more display indicators provide visual feedback in response to the controller actuating the electronic flow control system in response to either of (1) the control action, or (2) the user gesture.

2. The faucet assembly of claim 1, wherein the faucet is mounted to a countertop, and wherein the flow control box is mounted below the countertop.

3. The faucet assembly of claim 2, further comprising a power supply positioned below the countertop and electrically connected to the controller.

4. The faucet assembly of claim 1, wherein the one or more display indicators are integrated in the faucet body such that, when not illuminated, the faucet body appears to be a single integrated piece.

5. The faucet assembly of claim 1, wherein the faucet body further includes a handle mounted thereon, the handle being operable to control flow of water from water supply inlet hoses through the faucet.

6. The faucet assembly of claim 1, further comprising the computing device separate from the flow control box, the computing device including a microphone and providing the voice command to the server.

7. The faucet assembly of claim 1, wherein the voice command comprises a command to dispense a predetermined volume of liquid.

8. The faucet assembly of claim 1, wherein the user gesture comprises a gesture to adjust water flow through the faucet.

9. The faucet assembly of claim 1, wherein the flow volume includes an overall volume of water dispensed.

10. A method of controlling a faucet comprising:
receiving, via a microphone at a computing device, a voice command associated with a faucet, the faucet including a faucet body and a flow control enclosure separate from the faucet body, wherein the computing device is separate from the faucet;
sending the voice command from the computing device to a server;
receiving, at the computing device, a control action to be taken by the faucet from the server in response to the voice command;
transmitting the control action from the computing device to a controller in the flow control enclosure of the faucet, thereby actuating the faucet to perform the control action, wherein the flow control enclosure connects to at least two of a plurality of water supply inlet hoses and at least one outlet hose extending from the flow control enclosure into the faucet body, the flow control enclosure including a first valve and a second valve, the first and second valves being electronically controllable via the control action, and wherein operation of each of the first and second valves is controlled by a motor within the flow control enclosure;

receiving, via a hands-free sensor integrated into the faucet body, a user gesture associated with the faucet; and in response to the user gesture, actuating the flow control enclosure to operate the faucet in accordance with the user gesture.

11. The method of claim 10, further comprising manually adjusting a handle mounted to the faucet body to adjust water flow through the faucet.

12. The method of claim 11, further comprising providing visual feedback via one or more display indicators in response to the controller actuating the flow control enclosure in response to at least one of (1) the control action, or (2) the user gesture.

13. The method of claim 10, wherein the faucet body lacks a handle.

14. A faucet assembly comprising:
 a faucet comprising a faucet body and a spray head, the faucet body forming a single integrated piece without a faucet handle;
 a flow control box, the flow control box being separate from the faucet body, wherein the flow control box includes:
  an electronic flow control system to adjust flow volume of water being dispensed, wherein the electronic flow control system includes a first valve and a second valve and is fluidically connected to an outlet hose leading to the spray head, wherein the operation of each of the first and second valves is controlled by a motor of the electronic flow control system; and
  a controller configured to receive a control action from a server configured to issue control actions to the faucet assembly via a network connection between the faucet assembly and the server, the control action being based on a voice command received at the server from a computing device separate from the flow control box, and receive signals from a hands-free sensor configured to sense a user gesture,
  wherein the controller is further configured to control the electronic flow control system to adjust the flow volume of water being dispensed based on at least one of the control action or the user gesture; and
 a user interface integrated into the faucet body and including one or more display indicators and the hands-free sensor,
 wherein the one or more display indicators provide visual feedback in response to the controller actuating the electronic flow control system in response to either of (1) the control action, or (2) the user gesture.

15. The faucet assembly of claim 14, wherein the spray head is detachable from the faucet body.

16. A faucet assembly comprising:
 a faucet comprising a faucet body and a spray head, the faucet body forming a single integrated piece without a faucet handle;
 a flow control box, the flow control box being separate from the faucet body, wherein the flow control box includes:
  an electronic flow control system to adjust flow volume of water being dispensed, wherein the electronic flow control system includes a first valve and a second valve and is fluidically connected to an outlet hose leading to the spray head, wherein the operation of each of the first and second valves is controlled by a motor of the electronic flow control system; and
  a controller configured to receive a control action from a server configured to issue control actions to the faucet assembly via a network connection between the faucet assembly and the server, the control action being based on a voice command received at the server from a computing device separate from the flow control box,
  wherein the controller is further configured to control the electronic flow control system to adjust the flow volume of water being dispensed based on the control action; and
 a user interface integrated into the faucet body and including one or more display indicators and the hands-free sensor,
 wherein the one or more display indicators provide visual feedback in response to the controller actuating the electronic flow control system in response to the control action.

* * * * *